US010863444B2

(12) United States Patent
Wang et al.

(10) Patent No.: US 10,863,444 B2
(45) Date of Patent: Dec. 8, 2020

(54) POWER CONFIGURATION METHOD AND RELATED DEVICE

(71) Applicant: Huawei Technologies Co., Ltd., Shenzhen (CN)

(72) Inventors: Ting Wang, Shanghai (CN); Shengyue Dou, Shanghai (CN); Yuanjie Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/505,225

(22) Filed: Jul. 8, 2019

(65) Prior Publication Data

US 2019/0335399 A1 Oct. 31, 2019

Related U.S. Application Data

(63) Continuation of application No. PCT/CN2017/117543, filed on Dec. 20, 2017.

(30) Foreign Application Priority Data

Jan. 6, 2017 (CN) .......................... 2017 1 0009702
Apr. 1, 2017 (CN) .......................... 2017 1 0213795
May 5, 2017 (CN) .......................... 2017 1 0314209

(51) Int. Cl.
*H04W 52/14* (2009.01)
*H04W 52/22* (2009.01)
*H04W 52/32* (2009.01)

(52) U.S. Cl.
CPC ....... *H04W 52/143* (2013.01); *H04W 52/221* (2013.01); *H04W 52/325* (2013.01)

(58) Field of Classification Search
CPC ............. H04W 52/143; H04W 52/325; H04W 52/221; H04W 52/18; H04W 52/04;
(Continued)

(56) References Cited

U.S. PATENT DOCUMENTS

2012/0213186 A1* 8/2012 Ng ........................ H04L 5/0023
370/329
2013/0265951 A1 10/2013 Ng et al.
(Continued)

FOREIGN PATENT DOCUMENTS

CN 102598568 A 7/2012
CN 102624495 A 8/2012
(Continued)

*Primary Examiner* — Dong-Chang Shiue
(74) *Attorney, Agent, or Firm* — Leydig, Voit & Mayer, Ltd.

(57) ABSTRACT

A power configuration method and a related device are provided. The method includes: receiving a first power configuration parameter and a second power configuration parameter from a network device; and when receiving a reference signal and data of a first antenna port group and a reference signal and data of a second antenna port group, determining, based on the first power configuration parameter and the reference signal of the first antenna port group, a power of the data that is from the first antenna port group, and determining, based on the second power configuration parameter and the reference signal of the second antenna port group, a power of the data that is from the second antenna port group, so that data sent by a corresponding antenna port group can be separately demodulated based on an obtained power, thereby improving accuracy for demodulating data of a plurality of antenna port groups.

20 Claims, 5 Drawing Sheets

(58) Field of Classification Search
CPC ... H04B 7/0426; H04B 7/0617; H04L 5/0051; H04L 5/0091
See application file for complete search history.

(56) References Cited

U.S. PATENT DOCUMENTS

| | | |
|---|---|---|
| 2013/0316719 A1 | 11/2013 | Mazzarese et al. |
| 2015/0092722 A1* | 4/2015 | Zhang ................ H04W 52/143 370/329 |
| 2017/0303220 A1* | 10/2017 | Sadeghi ............. H04W 72/042 |
| 2019/0037505 A1 | 1/2019 | Wang et al. |

FOREIGN PATENT DOCUMENTS

| | | |
|---|---|---|
| CN | 104247359 A | 12/2014 |
| CN | 106487474 A | 3/2017 |
| WO | 2010120106 A2 | 10/2010 |
| WO | 2016069162 A1 | 5/2016 |
| WO | 2017174034 A1 | 10/2017 |

* cited by examiner

POWER CONFIGURATION METHOD AND RELATED DEVICE

CROSS-REFERENCE TO RELATED APPLICATIONS

This application is a continuation of International Application No. PCT/CN2017/117543, filed on Dec. 20, 2017, which claims priority to Chinese Patent Application No. 201710314209.9, filed on May 5, 2017 and Chinese Patent Application No. 201710213795.8, filed on Apr. 1, 2017 and Chinese Patent Application No. 201710009702.X, filed on Jan. 6, 2017, all of which are incorporated herein by references in their entireties.

TECHNICAL FIELD

The present invention relates to the field of communications technologies, and specifically, to a power configuration method and a related device.

BACKGROUND

A next-generation mobile communications system requires large-capacity and high-quality data transmission. A multiple-input multiple-output (MIMO) technology is considered as one of key technologies that can implement future high-speed data transmission. A plurality of transmit antennas in a conventional centralized MIMO system are all centralized on a base station side. Different from the centralized MIMO system, a plurality of transmit antennas in a distributed MIMO system are distributed at different geographical locations, and pairs of receiving and sending links of the transmit antennas are more independent of each other. The distributed MIMO system has advantages such as a large capacity, low power consumption, larger coverage, and a relatively low electromagnetic damage to a human body, and is considered as one of alternative solutions for a future wireless communications system. In a distributed MIMO scenario, to improve signal reliability of an edge user and improve a throughput of an edge cell, data may be transmitted to user equipment (UE) by using a transmission method such as multipoint space frequency block coding (SFBC) or multipoint multi-stream transmission.

When the UE receives data from a plurality of transmission points, a power of a downlink data channel between each transmission point and the UE varies, and a power of a downlink data channel is usually used to demodulate downlink data sent by a transmission point through the downlink data channel. Therefore, the UE needs to know powers of downlink data channels between all transmission points and the UE when demodulating the downlink data. Usually, at a higher layer, only one power configuration parameter is configured for the UE, and the UE may obtain a power of a downlink data channel between one transmission point and the UE based on the power configuration parameter. If a plurality of transmission points transmit data to the UE, the UE may not accurately demodulate data transmitted by each transmission point.

SUMMARY

Embodiments of the present invention disclose a power configuration method and a related device, so as to improve accuracy for demodulating data transmitted by a plurality of transmission points.

A first aspect of the embodiments of the present invention discloses a power configuration method, where the method may include:

receiving, by a first network device, a first power configuration parameter and a second power configuration parameter that are sent by a second network device, and receiving reference signals and data that are sent by the second network device, where the reference signals include a reference signal of a first antenna port group and a reference signal of a second antenna port group; and determining, by the first network device, a first power of received data (data that is from the first antenna port group) based on the first power configuration parameter and the reference signal of the first antenna port group, and determining a second power of received data (data that is from the second antenna port group) based on the second power configuration parameter and the reference signal of the second antenna port group.

The data may be downlink data, or may be uplink data. The power configuration parameters, the reference signals, and the data may be sent in a same time unit, or may be sent in different time units.

In this embodiment of the present invention, the first network device receives two power configuration parameters sent by the second network device, and when receiving the reference signals and the data that is from a plurality of antenna port groups, the first network device may separately determine, based on a power configuration parameter and a reference signal that are corresponding to an antenna port group, a power of data that is from the antenna port group, so that data sent by a corresponding antenna port group can be separately demodulated based on an obtained power, and a relatively accurate demodulation result is obtained, thereby enhancing data transmission performance.

Optionally, the first network device may alternatively receive the first power configuration parameter sent by the second network device, and when receiving the reference signal and the data that is from the first antenna port group, the first network device determines, based on the first power configuration parameter and a power of the reference signal, a power of the data that is from the first antenna port group.

Optionally, the power configuration parameter is determined based on layer quantity information or antenna port quantity information that is corresponding to demodulation reference signal antenna port group information, codeword information, quasi co-location indication information, or transmission point information; or the power configuration parameter is determined based on demodulation reference signal antenna port pattern information that is corresponding to demodulation reference signal antenna port group information, codeword information, quasi co-location indication information, or transmission point information; or the power configuration parameter is determined based on layer quantity information or antenna port quantity information and demodulation reference signal antenna port pattern information that are corresponding to demodulation reference signal antenna port group information, codeword information, quasi co-location indication information, or transmission point information. Optionally, the power configuration parameter includes a power ratio.

Optionally, if one power configuration parameter is used for all antenna port groups, the power configuration parameter may be pre-defined in a protocol, so that the second network device does not need to send the power configuration parameters to the first network device, and the first network device may directly determine a power of received data based on a reference signal power and the power configuration parameter.

Optionally, the first network device may further receive a third power configuration parameter sent by the second network device.

Optionally, any one of the first power configuration parameter, the second power configuration parameter, and the third power configuration parameter includes at least one of a beam identifier, a beam antenna port, a reference signal power, and a power ratio.

Optionally, the third power configuration parameter and the first power configuration parameter and the second power configuration parameter may be sent by using same signaling, or may be sent by using different signaling. The third power configuration parameter is not limited to one power configuration parameter, and may be a power configuration parameter set including a plurality of power configuration parameters.

The second network device sends a plurality of power configuration parameters by using one piece of signaling, so that a quantity of signaling interactions can be reduced, and the first network device can directly obtain the plurality of power configuration parameters based on the one piece of signaling. This manner is relatively simple.

In this embodiment of the present invention, a beam identifier/beam antenna port is bound to a power ratio, and when there is no cell-specific reference signal (CRS), the power of the received data may be determined based on a demodulation reference signal such as a UE-specific reference signal, or another reference signal such as a beam reference signal, a mobility reference signal, or a synchronization signal, so as to correctly demodulate the data, and improve demodulation performance.

The beam reference signal is a beam-related reference signal. For example, the second network device sends one or more signals based on one or more beams, and may perform precoding, analog beamforming, or the like before sending the signals. For example, the beam reference signal is a synchronization signal, a broadcast signal, or a beam signal.

The mobility reference signal is a reference signal used to perform beam tracking or position tracking on a terminal device.

One beam includes one or more (logical) antennas, and a weight of each (logical) antenna formed by a precoding matrix of a baseband or a phase shift of a radio-frequency head is referred to as a beam.

The beam reference signal may be represented by one or more of an antenna port, a time-frequency resource, or a beam number, or may be represented in another manner. This is not limited in this embodiment of the present invention.

The synchronization signal is a signal used for synchronization in time domain and/or frequency domain between the first network device and the second network device. For example, the synchronization signal is a primary synchronization signal and/or a secondary synchronization signal in a Long Term Evolution (LTE) system, or may be represented in another manner. This is not limited in this embodiment of the present invention.

Optionally, the reference signal in this embodiment of the present invention may include at least one of a demodulation reference signal and a first reference signal, and the first reference signal may include at least one of a beam reference signal, a mobility reference signal, and a synchronization signal. A power ratio in a power configuration parameter may include at least one of the following:

(1) a ratio of a power of data of an antenna port group of a demodulation reference signal on a symbol on which a demodulation reference signal exists to a power of the demodulation reference signal of the antenna port group;

(2) a ratio of a power of data of an antenna port group of a demodulation reference signal on a symbol on which a demodulation reference signal exists to a power of the first reference signal;

(3) a ratio of a power of data of an antenna port group of a demodulation reference signal on a symbol on which no demodulation reference signal exists to a power of the demodulation reference signal of the antenna port group;

(4) a ratio of a power of data of an antenna port group of a demodulation reference signal on a symbol on which no demodulation reference signal exists to a power of data of an antenna port group of a demodulation reference signal on a symbol on which a demodulation reference signal exists; and (5) a ratio of a power of data of an antenna port group of a demodulation reference signal on a symbol on which no demodulation reference signal exists to a power of the first reference signal.

Specifically, a specific manner of receiving, by the first network device, the first power configuration parameter and the second power configuration parameter that are sent by the second network device may be:

obtaining, by the first network device, the first power configuration parameter and the second power configuration parameter from the second network device by using radio resource control (RRC) signaling or physical layer signaling, or by using other signaling, such as Medium Access Control (MAC) signaling, where no specific limitation is imposed herein.

Optionally, either of the first antenna port group and the second antenna port group includes at least one antenna port; and either of the first antenna port group and the second antenna port group is corresponding to at least one codeword, or either of the first antenna port group and the second antenna port group is corresponding to at least one transmission layer.

In other words, each antenna port group may include at least one antenna port; each antenna port group may be used to transmit at least one codeword, or a plurality of antenna port groups may be used to transmit one codeword, and different antenna port groups may be corresponding to different transmission layers of a same codeword; one codeword may be corresponding to data of one transmission layer or a plurality of transmission layers; and each antenna port group may alternatively be used to transmit data of at least one transmission layer, or a plurality of antenna port groups may alternatively be used to transmit data of a same transmission layer.

A correspondence between an antenna port group and a codeword and/or a transmission layer may be indicated by the second network device in downlink control information (DCI), or may be pre-defined, or may be notified by using RRC signaling, MAC signaling, or physical layer signaling. This is not limited in this embodiment of the present invention.

It can be understood that, a transmission time interval may be relatively long if the RRC signaling is used, and the RRC signaling may be used to semi-statically configure a power configuration parameter, and is applicable to a scenario with a slow change, to reduce signaling overheads. DCI signaling can implement dynamic configuration, and is applicable to a scenario with a fast change, where signaling overheads need to be further considered. Therefore, a two-level indication may be used. A plurality of pieces of signaling may be pre-configured, and a further indication is provided during specific use. This is a compromised implementation of the foregoing two manners, and a configuration interval and signaling overheads are moderate.

Further, different power configurations are performed for different codewords, so as to improve codeword decoding performance. A same power configuration may be set in one codeword, so as to reduce signaling overheads. Different power configurations are performed for different transmission layers, so as to improve transmission performance at different layers. Different power configurations are set for an antenna port group, so as to reduce signaling overheads when one antenna port group includes a plurality of antenna ports.

Optionally, the method may further include:

receiving, by the first network device, information that is sent by the second network device and that is used to indicate a correspondence between a power configuration parameter and at least one of a quantity of transmission layers, an antenna port, a codeword, and a scrambling identity; or any one of the first power configuration parameter, the second power configuration parameter, and the third power configuration parameter further includes a power configuration identifier used to indicate the power configuration parameter, and the method may further include: receiving, by the first network device, information that is sent by the second network device and that is used to indicate a correspondence between the power configuration identifier and at least one of a quantity of transmission layers, an antenna port, a codeword, and a scrambling identity.

In other words, each power configuration parameter may be indicated by using a unique power configuration identifier, and the first network device may receive the information that is sent by the second network device and that is used to indicate a correspondence between a power configuration parameter or a power configuration identifier and at least one of a quantity of transmission layers, an antenna port, a codeword, and a scrambling identity.

The information and the power configuration parameters may be sent in a same time unit, or may be sent in different time units.

Optionally, the method may further include:

receiving, by the first network device, information that is sent by the second network device and that is used to indicate a correspondence between a beam identifier and at least one of a quantity of transmission layers, an antenna port, and a codeword, and receiving information that is sent by the second network device and that is used to indicate a correspondence between a beam identifier and a power configuration parameter; or any one of the first power configuration parameter, the second power configuration parameter, and the third power configuration parameter further includes a power configuration identifier used to indicate the power configuration parameter, and the method may further include: receiving, by the first network device, information that is sent by the second network device and that is used to indicate a correspondence between a beam identifier and at least one of a quantity of transmission layers, an antenna port, and a codeword, and receiving information that is sent by the second network device and that is used to indicate a correspondence between a beam identifier and the power configuration identifier.

The information that is used to indicate a correspondence between a beam identifier and at least one of a quantity of transmission layers, an antenna port, and a codeword and the information that is used to indicate a correspondence between a beam identifier and a power configuration parameter or a power configuration identifier may be sent in a same time unit, or may be sent in different time units; and may be sent by using same signaling, or may be separately sent by using different signaling, for example, may be configured by using RRC signaling or MAC signaling, or sent by using physical layer signaling.

The second network device does not need to carry each power configuration parameter in signaling, but only needs to set a power configuration identifier used to indicate the power configuration parameter, and carry the power configuration identifier in the signaling. Generally, a data amount of a power configuration identifier may be smaller than that of a corresponding power configuration parameter. In this way, a data amount carried by signaling can be reduced.

In this embodiment of the present invention, for different beams, the second network device may transmit data by using different powers. Therefore, different beam identifiers may be corresponding to different power configuration parameters, thereby improving data transmission performance of different beams.

In addition, a beam identifier is corresponding to a power configuration parameter, so that signaling overheads can be reduced during configuration of the second network device, and only related beam information needs to be indicated during specific use.

Further, different beam identifiers may be corresponding to codewords, transmission layers, or antenna ports, that is, information of different codewords, transmission layers, or antenna ports may be sent by using different beams, so as to improve data transmission performance of the corresponding codewords, transmission layers, or antenna ports.

A second aspect of the embodiments of the present invention discloses a power configuration method, where the method may include:

sending, by a second network device, a first power configuration parameter and a second power configuration parameter to a first network device, and sending reference signals and data, where the reference signals include a reference signal of a first antenna port group and a reference signal of a second antenna port group, the first power configuration parameter and the reference signal of the first antenna port group are used to determine a first power of received data, and the second power configuration parameter and the reference signal of the second antenna port group are used to determine a second power of received data.

In other words, when receiving the two power configuration parameters and receiving the reference signals and the data that is from a plurality of antenna port groups, the first network device may separately determine, based on a power configuration parameter and a reference signal that are corresponding to an antenna port group, a power of data that is from the antenna port group, so that data sent by a corresponding antenna port group can be separately demodulated based on an obtained power, and a relatively accurate demodulation result is obtained, thereby enhancing data transmission performance.

Optionally, the data may be downlink data, or may be uplink data. The power configuration parameters, the reference signals, and the data may be sent in a same time unit, or may be sent in different time units.

Optionally, the second network device may alternatively send only the first power configuration parameter to the first network device, so that when receiving the reference signal and data that is from the first antenna port group, the first network device determines, based on the first power configuration parameter and a power of the reference signal, a power of the data that is from the first antenna port group.

Optionally, if one power configuration parameter is used for all antenna port groups, the power configuration parameter may be pre-defined in a protocol, so that the second network device does not need to send the power configuration parameters to the first network device, and the first network device may directly determine a power of received data based on a reference signal power and the power configuration parameter.

Optionally, the second network device may further send a third power configuration parameter to the first network device.

Optionally, any one of the first power configuration parameter, the second power configuration parameter, and the third power configuration parameter includes at least one of a beam identifier, a beam antenna port, a reference signal power, and a power ratio.

Optionally, the third power configuration parameter and the first power configuration parameter and the second power configuration parameter may be sent by using same signaling, or may be sent by using different signaling. The third power configuration parameter is not limited to one power configuration parameter, and may be a power configuration parameter set including a plurality of power configuration parameters.

The second network device sends a plurality of power configuration parameters by using one piece of signaling, so that a quantity of signaling interactions can be reduced, and the first network device can directly obtain the plurality of power configuration parameters based on the one piece of signaling. This manner is relatively simple.

In this embodiment of the present invention, a beam identifier/beam antenna port is bound to a power ratio, and when there is no CRS, the power of the received data may be determined based on a demodulation reference signal such as a UE-specific reference signal, or another reference signal such as a beam reference signal, a mobility reference signal, or a synchronization signal, so as to correctly demodulate the data, and improve demodulation performance.

Optionally, the reference signal in this embodiment of the present invention may include at least one of a demodulation reference signal and a first reference signal, and the first reference signal may include at least one of a beam reference signal, a mobility reference signal, and a synchronization signal. A power ratio in a power configuration parameter may include at least one of the following:

(1) a ratio of a power of data of an antenna port group of a demodulation reference signal on a symbol on which a demodulation reference signal exists to a power of the demodulation reference signal of the antenna port group;

(2) a ratio of a power of data of an antenna port group of a demodulation reference signal on a symbol on which a demodulation reference signal exists to a power of the first reference signal;

(3) a ratio of a power of data of an antenna port group of a demodulation reference signal on a symbol on which no demodulation reference signal exists to a power of the demodulation reference signal of the antenna port group;

(4) a ratio of a power of data of an antenna port group of a demodulation reference signal on a symbol on which no demodulation reference signal exists to a power of data of an antenna port group of a demodulation reference signal on a symbol on which a demodulation reference signal exists; and (5) a ratio of a power of data of an antenna port group of a demodulation reference signal on a symbol on which no demodulation reference signal exists to a power of the first reference signal.

Specifically, a specific manner of sending, by the second network device, the first power configuration parameter and the second power configuration parameter to the first network device may be:

configuring, by the second network device, the first power configuration parameter and the second power configuration parameter by using RRC signaling or MAC signaling, or sending the first power configuration parameter and the second power configuration parameter to the first network device by using physical layer signaling.

Optionally, either of the first antenna port group and the second antenna port group includes at least one antenna port; and either of the first antenna port group and the second antenna port group is corresponding to at least one codeword, or either of the first antenna port group and the second antenna port group is corresponding to at least one transmission layer.

A correspondence between an antenna port group and a codeword and/or a transmission layer may be indicated by the second network device in DCI, or may be pre-defined, or may be notified by using RRC signaling, MAC signaling, or physical layer signaling. This is not limited in this embodiment of the present invention.

It can be understood that, a transmission time interval may be relatively long if the RRC signaling is used, and the RRC signaling may be used to semi-statically configure a power configuration parameter, and is applicable to a scenario with a slow change, to reduce signaling overheads. DCI signaling can implement dynamic configuration, and is applicable to a scenario with a fast change, where signaling overheads need to be further considered. Therefore, a two-level indication may alternatively be used. A plurality of pieces of signaling may be pre-configured, and a further indication is provided during specific use. This is a compromised implementation of the foregoing two manners, and a configuration interval and signaling overheads are moderate. At a first level, RRC signaling, MAC signaling, or physical layer signaling may be used, and at a second level, RRC signaling, MAC signaling, or physical layer signaling may also be used. A same type or different types of signaling or other signaling may be used for the two levels. This is not limited in this embodiment of the present invention.

Further, different power configurations are performed for different codewords, so as to improve codeword decoding performance. A same power configuration may be set in one codeword, so as to reduce signaling overheads. Different power configurations are performed for different transmission layers, so as to improve transmission performance at different layers. Different power configurations are set for an antenna port group, so as to reduce signaling overheads when one antenna port group includes a plurality of antenna ports.

Optionally, the method may further include:

sending, by the second network device to the first network device, information that is used to indicate a correspondence between a power configuration parameter and at least one of a quantity of transmission layers, an antenna port, a codeword, and a scrambling identity; or any one of the first power configuration parameter, the second power configuration parameter, and the third power configuration parameter further includes a power configuration identifier used to indicate the power configuration parameter, and the method may further include: sending, by the second network device to the first network device, information that is used to indicate a correspondence between the power configuration identifier and at least one of a quantity of transmission layers, an antenna port, a codeword, and a scrambling identity.

In other words, each power configuration parameter may be indicated by using a unique power configuration identifier, and the first network device may receive the information that is sent by the second network device and that is used to indicate a correspondence between a power configuration parameter or a power configuration identifier and at least one of a quantity of transmission layers, an antenna port, a codeword, and a scrambling identity.

The information and the power configuration parameters may be sent in a same time unit, or may be sent in different time units.

Optionally, the method may further include:

sending, by the second network device to the first network device, information that is used to indicate a correspondence between a beam identifier and at least one of a quantity of transmission layers, an antenna port, and a codeword, and sending information that is used to indicate a correspondence between a beam identifier and a power configuration parameter; or any one of the first power configuration parameter, the second power configuration parameter, and the third power configuration parameter further includes a power configuration identifier used to indicate the power configuration parameter, and the method may further include: sending, by the second network device to the first network device, information that is used to indicate a correspondence between a beam identifier and at least one of a quantity of transmission layers, an antenna port, and a codeword, and sending information that is used to indicate a correspondence between a beam identifier and the power configuration identifier.

The information that is used to indicate a correspondence between a beam identifier and at least one of a quantity of transmission layers, an antenna port, and a codeword and the information that is used to indicate a correspondence between a beam identifier and a power configuration parameter or a power configuration identifier may be sent in a same time unit, or may be sent in different time units; and may be sent by using same signaling, or may be separately sent by using different signaling, for example, may be configured by using RRC signaling or MAC signaling, or sent by using physical layer signaling.

The second network device does not need to carry each power configuration parameter in signaling, but only needs to set a power configuration identifier used to indicate the power configuration parameter, and carry the power configuration identifier in the signaling. Generally, a data amount of a power configuration identifier may be smaller than that of a corresponding power configuration parameter. In this way, a data amount carried by signaling can be reduced.

In this embodiment of the present invention, for different beams, the second network device may transmit data by using different powers. Therefore, different beam identifiers may be corresponding to different power configuration parameters, thereby improving data transmission performance of different beams.

In addition, a beam identifier is corresponding to a power configuration parameter, so that signaling overheads can be reduced during configuration of the second network device, and only related beam information needs to be indicated during specific use.

Further, different beam identifiers may be corresponding to codewords, transmission layers, or antenna ports, that is, different codewords, transmission layers, or antenna ports may be sent by using different beams, so as to improve data transmission performance of the corresponding codewords, transmission layers, or antenna ports.

A third aspect of the embodiments of the present invention discloses a network device. The network device may include a receiving module and a processing module, configured to perform the power configuration method described in the first aspect. A plurality of power configuration parameters are received, and when data and a reference signal are received from an antenna port group, a power of data that is from the antenna port group is determined based on a power configuration parameter and the reference signal that are corresponding to the antenna port group, so as to accurately demodulate the received data, and improve data transmission performance.

A fourth aspect of the embodiments of the present invention discloses another network device. The network device may include a processor, a transceiver, and a memory. The processor, the transceiver, and the memory are connected to each other. The transceiver is controlled by the processor, and is configured to receive or send a message. The memory is configured to store a set of program code. The processor is configured to invoke the program code stored in the memory to perform the power configuration method disclosed in the first aspect. A plurality of power configuration parameters are received, and when data and a reference signal are received from an antenna port group, a power of data that is from the antenna port group is determined based on a power configuration parameter and the reference signal that are corresponding to the antenna port group, so as to accurately demodulate the received data, and improve data transmission performance.

A fifth aspect of the embodiments of the present invention discloses still another network device. The network device may include a sending module, configured to perform the power configuration method described in the second aspect. A plurality of power configuration parameters are sent, so that when receiving data and a reference signal from an antenna port group, a receive end may determine a power of the data that is from the antenna port group based on a power configuration parameter and the reference signal that are corresponding to the antenna port group, so as to accurately demodulate the received data, and improve data transmission performance.

A sixth aspect of the embodiments of the present invention discloses yet another network device. The network device may include a processor, a transceiver, and a memory. The processor, the transceiver, and the memory are connected to each other. The transceiver is controlled by the processor, and is configured to receive or send a message. The memory is configured to store a set of program code. The processor is configured to invoke the program code stored in the memory to perform the power configuration method disclosed in the second aspect. A plurality of power configuration parameters are sent, so that when receiving data and a reference signal from an antenna port group, a receive end may determine a power of the data that is from the antenna port group based on a power configuration parameter and the reference signal that are corresponding to the antenna port group, so as to accurately demodulate the received data, and improve data transmission performance.

The embodiments of the present invention have the following benefits:

In the embodiments of the present invention, the first network device receives two power configuration parameters sent by the second network device, and when receiving the reference signals and the data that is from a plurality of antenna port groups, the first network device may separately determine, based on a power configuration parameter and a reference signal that are corresponding to an antenna port group, a power of data that is from the antenna port group, so that data sent by a corresponding antenna port group can be separately demodulated based on an obtained power, thereby improving accuracy for demodulating the data of the plurality of antenna port groups, and enhancing data transmission performance.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following descriptions show merely some embodiments of the present invention, and a person of ordinary skill in the art may derive other drawings from these accompanying drawings without creative efforts.

DESCRIPTION OF EMBODIMENTS

Figure 1:
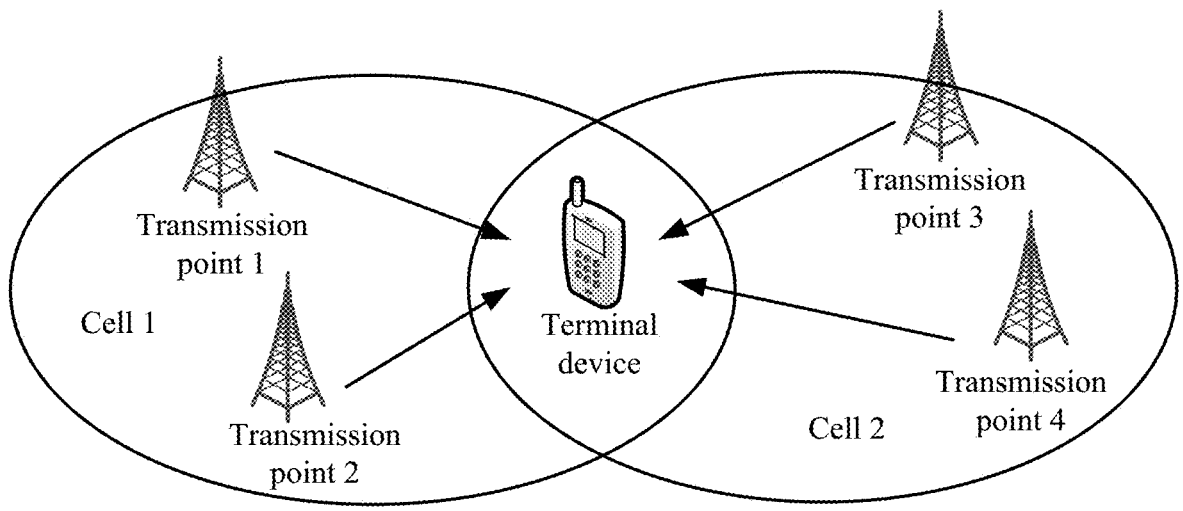
FIG. 1 is a schematic diagram of a scenario in which a plurality of antenna sites perform coordinated transmission according to an embodiment of the present invention.

The following describes the embodiments of the present invention in detail with reference to the accompanying drawings of this specification.

Technologies described in this specification may be applied to various communications systems, for example, a 5G or next-generation communications system, for example, a Global System for Mobile Communications (GSM) system, a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency-Division Multiple Access (OFDMA) system, a Single-Carrier Frequency Division Multiple Access (SC-FDMA) system, a General Packet Radio Service (GPRS) system, and other communications systems of this type.

In the embodiments of the present invention, a main scenario is as follows: An existing MIMO technology (including a diversity technology for improving transmission reliability and a multi-stream technology for improving a data transmission rate) is combined with coordinated multipoint transmission based on existing coordinated multipoint transmission/reception (CoMP), to better serve a user.

The embodiments of the present invention may also be applied to a scenario of single-point transmission, where a transmission point has a plurality of panels; or a scenario of coordinated multipoint transmission, where a transmission point has a single panel or a plurality of panels; or a scenario of single-point transmission, where a transmission point has a plurality of antennas.

The embodiments of the present invention are applicable to both a homogeneous network scenario and a heterogeneous network scenario, and a type of a transmission point is not limited. For example, the embodiments of the present invention may be applied to coordinated multipoint transmission between macro base stations, between micro base stations, and between a macro base station and a micro base station.

The embodiments of the present invention may be applied to a time division duplex (TDD) system or a frequency division duplex (FDD) system, may be applied to a single-carrier system or a multicarrier system, and may be applied to a high-frequency (higher than a frequency band of 6 GHz) communications system or a low-frequency (lower than a frequency band of 6 GHz) communications system.

The following describes some terms in the embodiments of the present invention, to facilitate understanding by a person skilled in the art.

A terminal device is a device that provides a user with voice and/or data connectivity, and may be a handheld device with a wireless connection function, or a processing device connected to a wireless modem. The terminal device may communicate with a core network through a radio access network (RAN), to exchange voice and/or data with the RAN. Specifically, the terminal device may be UE, a wireless terminal device, a mobile terminal device, a subscriber unit, a subscriber station, a mobile station, a mobile console, a remote station, an access point (AP), a remote terminal device, an access terminal device, a user terminal device, a user agent, a user device, or the like. For example, the terminal device may be a mobile phone (or referred to as a "cellular" phone), a computer with a mobile terminal device, or a portable, pocket-sized, handheld, computer built-in, or in-vehicle mobile apparatus. For example, the terminal device may be a device such as a personal communication service (PCS) phone, a cordless telephone set, a Session Initiation Protocol (SIP) phone, a wireless local loop (WLL) station, or a personal digital assistant (PDA).

A network device is a device communicating with a terminal device over an air interface on an access network by using one or more sectors, and may be a base station, such as an access point. The base station may be configured to perform conversion between a received over-the-air frame and an Internet Protocol (IP) packet, and serve as a router between the terminal device and a rest part of the access network. The rest part of the access network may include an IP network. The base station may further coordinate attribute management of the air interface. The base station may be a radio network controller (RNC) or a base station controller (BSC), or may be an evolved NodeB (NodeB, eNB, or e-NodeB) in an LTE-Advanced (LTE-A) system. This is not limited in the embodiments of the present invention.

Coordinated multipoint transmission/reception (CoMP) means that a plurality of separate transmission points at different geographical locations jointly transmit data to a terminal device, for example, may transmit data to a terminal device through a physical downlink shared channel (PDSCH); or may jointly receive data sent by a terminal device, for example, may receive, through a physical uplink shared channel (PUSCH), data sent by a terminal device.

Multipoint SFBC transmission means that antennas of two or more distributed transmission points transmit signals in an SFBC manner.

Multipoint multi-stream transmission means that two or more distributed transmission points independently perform precoding to transmit different data streams or different code blocks. In joint transmission in CoMP, different transmission points transmit a same data stream to a same terminal device.

A multi-panel structure means that each transmission point may have a plurality of panels, where the panels may be arranged uniformly, nonuniformly, or in another form. For example, one transmission point may have four panels, an antenna port may be formed by antenna elements of one panel, or may be formed by antenna elements of a plurality of panels.

A MIMO technology is a technology in which a plurality of transmit antennas and receive antennas are used at a transmit end and a receive end separately, so that a signal is transmitted and received by using the plurality of antennas at the transmit end and the receive end, so as to improve communication quality. The MIMO technology may also be referred to as a multi-antenna technology, and can improve system reliability through space diversity, increase a system capacity through spatial multiplexing, and improve cell coverage through beamforming.

A transmission point is a device that can transmit data to a terminal device. In the embodiments of the present invention, one transmission point may be considered as one antenna port group, and one antenna port group may also include ports of a plurality of transmission points. This is not limited in the embodiments of the present invention. The antenna port group herein may be a hardware concept or a logical concept. One antenna port group may include at least one port. For example, the transmission point may be a base station. One antenna port group is corresponding to one base station, and different base stations may be considered as different transmission points. Alternatively, the transmission point may be a cell. One antenna port group is corresponding to one cell, and different cells may be considered as different transmission points. Alternatively, one cell may include a plurality of transmission points, and one cell includes a plurality of antenna port groups. For example, a plurality of building baseband units (BBU) and remote radio units (RRU) may be deployed in a coverage area of one cell, and an antenna port group corresponding to each group of BBU and RRU may be considered as one transmission point. The concept of the transmission point is not limited in the embodiments of the present invention, provided that each transmission point can independently transmit data to the terminal device.

For a same transmission point, power configuration parameters used at different moments may be the same or different. In addition, if a same cell includes a plurality of transmission points, the cell may be corresponding to one power configuration parameter, or may be corresponding to a plurality of power configuration parameters.

For a power configuration parameter, one power configuration parameter may be corresponding to one antenna port group. In other words, a power configuration parameter of an antenna port group may be used to determine a power of data corresponding to the antenna port group. Different antenna port groups may be corresponding to a same power configuration parameter, and or may be corresponding to different power configuration parameters.

A first network device may be a common terminal device, or a terminal device executing a relay task, or may be a base station. This is not limited in the embodiments of the present invention.

A second network device may be a base station, or may be a common terminal device, or may be a terminal device executing a relay task. This is not limited in the embodiments of the present invention.

The first network device and the second network device may be of a same type, or may be of different types. For example, in a device-to-device (D2D) scenario, both the first network device and the second network device may be base stations or terminal devices, or may be set in another possible manner.

In the embodiments of the present invention, when the second network device is a transmission point (such as a base station), the first network device may be a terminal device, or may be a transmission point (such as a base station); or when the second network device is a terminal device, the first network device may be a terminal device, or may be a transmission point (such as a base station). This is not limited in the embodiments of the present invention. In other words, data received by the first network device may be uplink data or downlink data.

Data may be downlink data, that is, data such as PDSCH data that is sent by a transmission point to a terminal device through a downlink data channel between the transmission point and the terminal device; or may be uplink data, that is, data such as PUSCH data that is reported by a terminal device to a transmission point through an uplink data channel between the terminal device and the transmission point.

It should be noted that, in the embodiments of the present invention, the terms "system" and "network" can be used interchangeably, "cell" and "carrier" can be used interchangeably, and concepts of "a quantity of data streams" and "a quantity of transmission layers" can be used interchangeably. "At least one" is one or more than one, and "a plurality of" is two or more than two. The term "and/or" describes an association relationship for describing associated objects and represents that three relationships may exist. For example, A and/or B may represent the following three cases: Only A exists, both A and B exist, and only B exists. In addition, the character "/" usually indicates an "or" relationship between the associated objects unless otherwise specified.

To better understand a power configuration method and a related device disclosed in the embodiments of the present invention, the following first describes an application scenario to which the embodiments of the present invention are applicable. FIG. 1 is a schematic diagram of a scenario in which a plurality of antenna sites perform coordinated transmission according to an embodiment of the present invention. In the scenario shown in FIG. 1, a left circle represents a coverage area of a cell 1, and the cell 1 includes two transmission points, for example, a transmission point 1 and a transmission point 2 shown in FIG. 1; and a right circle represents a coverage area of a cell 2, and the cell 2 also includes two transmission points, for example, a transmission point 3 and a transmission point 4 shown in FIG. 1. All the transmission point 1, the transmission point 2, the transmission point 3, and the transmission point 4 participate in coordinated transmission for a terminal device.

In the scenario shown in FIG. 1, after receiving downlink data separately sent by the transmission point 1, the transmission point 2, the transmission point 3, and the transmission point 4, the terminal device may calculate a power of data on each transmission point based on a power configuration parameter and a power of a reference signal (RS) of the transmission point.

The reference signal may be a demodulation reference signal, that is, a reference signal used to demodulate data, for example, a UE-specific reference signal (UE-specific RS). Alternatively, the reference signal may be a beam reference signal (BRS), that is, a reference signal related to a beam. For example, a transmission point sends one or more signals based on one or more beams, and may perform precoding, analog beamforming, or the like before sending the signals. For example, the beam reference signal is a synchronization signal, a broadcast signal, or a beam signal. Alternatively, the reference signal may be a mobility reference signal (MRS), that is, a reference signal used to perform beam tracking or position tracking on a terminal device. Alternatively, the reference signal may be a synchronization signal, that is, a signal used for synchronization in time domain and/or frequency domain between a transmission point and a terminal device. For example, the synchronization signal is a primary synchronization signal and/or a secondary synchronization signal in an LTE system, or may be represented in another manner. This is not limited in the embodiments of the present invention.

One beam includes one or more (logical) antennas, and a weight of each (logical) antenna formed by a precoding matrix of a baseband or a phase shift of a radio-frequency head is referred to as a beam.

The BRS may be represented by one or more of an antenna port, a time-frequency resource, or a beam number, or may be represented in another manner. This is not limited in the embodiments of the present invention.

Figure 2:
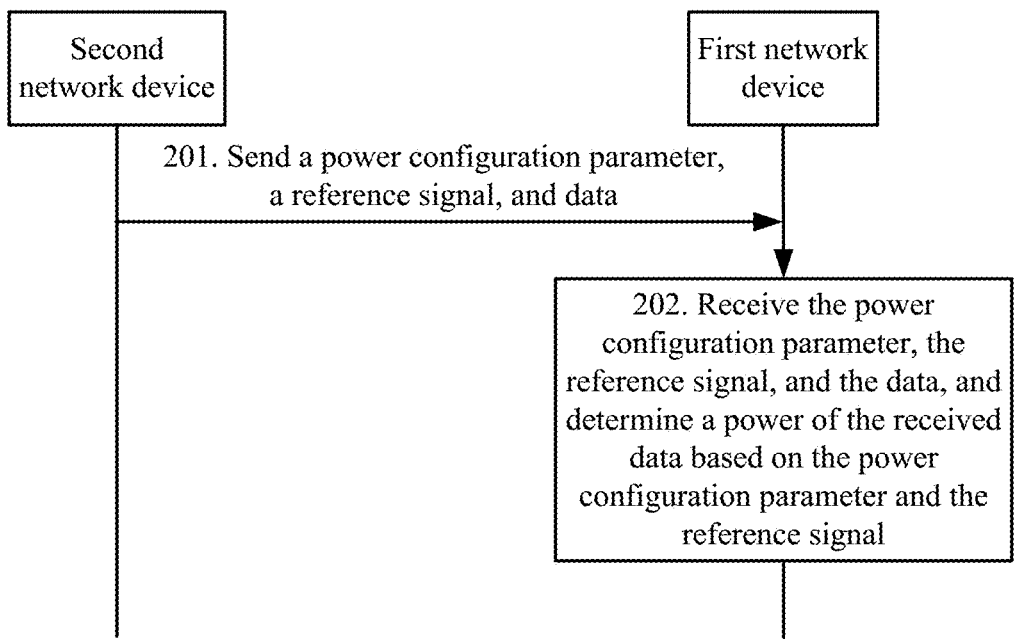
FIG. 2 is a schematic flowchart of a power configuration method according to an embodiment of the present invention.

FIG. 2 is a schematic flowchart of a power configuration method according to an embodiment of the present invention. As shown in FIG. 2, the power configuration method may include the following steps.

201. A second network device sends a power configuration parameter, a reference signal, and data to a first network device.

In this embodiment of the present invention, the second network device sends one power configuration parameter to the first network device. The power configuration parameter is corresponding to an antenna port group, that is, the power configuration parameter is used to determine a power of data sent by the antenna port group corresponding to the power configuration parameter. Each antenna port group may include one antenna port, or may include a plurality of antenna ports. In other words, one power configuration parameter may be used for a plurality of antenna ports, or one power configuration parameter may be used for one antenna port.

Optionally, if one power configuration parameter is used for all antenna port groups, the second network device may not send the power configuration parameter to the first network device, and the first network device may obtain the power configuration parameter in a pre-defined manner, such as a protocol-specified manner, so as to determine a power of received data.

In this embodiment of the present invention, the second network device may send the power configuration parameter, the reference signal, and the data in a same time unit, or in different time units. This is not limited in this embodiment of the present invention. The time unit may be a time unit such as a subframe, a frame, a slot, or a mini-slot for dividing a time granularity. The power configuration parameter may be updated regularly.

The power configuration parameter may include at least one of a beam identifier, a beam antenna port, a reference signal power, and a power ratio. The reference signal may be at least one of a demodulation reference signal, a BRS, an MRS, and a synchronization signal.

202. The first network device receives the power configuration parameter, the reference signal, and the data, and determines a power of the received data based on the power configuration parameter and the reference signal.

In this embodiment of the present invention, the first network device may calculate, based on a power configuration parameter and a reference signal (specifically, a power of the reference signal) that are corresponding to an antenna port group, a power of data that is from the antenna port group. The power of the reference signal may be directly notified by the second network device, or may be obtained by the first network device through measurement. For example, a base station sends a BRS in advance, a terminal device obtains a power status by receiving the BRS, and subsequently, the base station needs to notify the terminal device of only power ratio information.

A data power in the prior art depends on a power of a CRS. In addition, currently, powers of all antenna ports that transmit a PDSCH of a same moment are the same. However, there is no CRS in 5G communication, and determining a data power in this manner does not meet a requirement of multi-panel transmission in multipoint coordination or 5G communication. In this embodiment of the present invention, a power of to-be-received data may be determined based on a configured power configuration parameter and another reference signal, so as to receive the data, and improve data transmission performance. For example, the another reference signal is a reference signal (such as a demodulation reference signal, a BRS, or an MRS) sent by another port/beam; or another reference signal sent by another channel such as a synchronization channel, or sent by a same port/beam.

It can be learned that, in the method shown in FIG. 2, the second network device may send one power configuration parameter to the first network device, and send a reference signal and data of a corresponding antenna port group, so that the first network device determines a power of the received data based on the power configuration parameter and a power of the reference signal, and demodulates the data, thereby improving demodulation accuracy.

Figure 3:
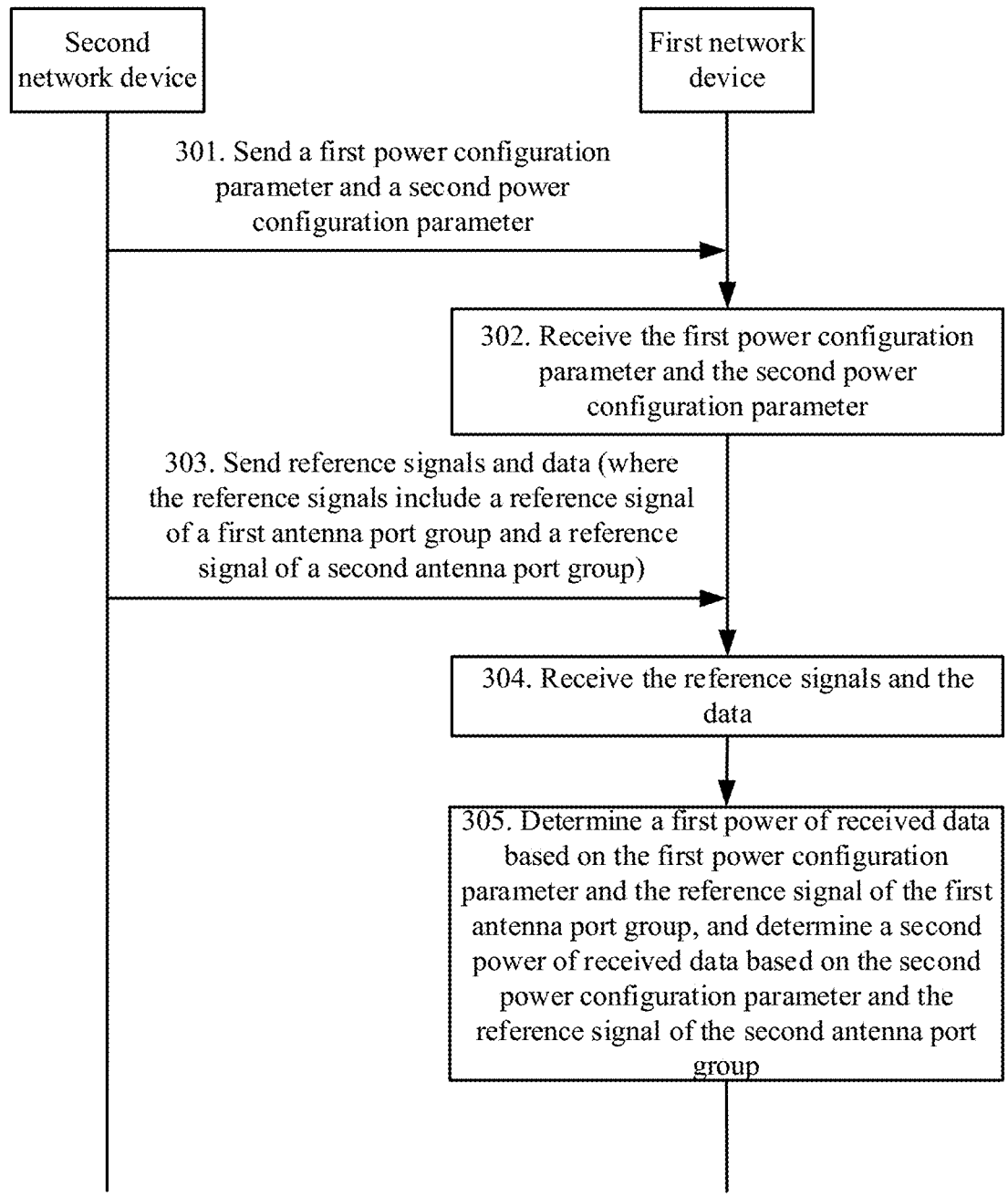
FIG. 3 is a schematic flowchart of another power configuration method according to an embodiment of the present invention.

FIG. 3 is a schematic flowchart of another power configuration method according to an embodiment of the present invention. As shown in FIG. 3, the power configuration method may include the following steps.

301. A second network device sends a first power configuration parameter and a second power configuration parameter to a first network device.

Specifically, the second network device may configure the first power configuration parameter and the second power configuration parameter by using RRC signaling or MAC signaling, or may send the first power configuration parameter and the second power configuration parameter to the first network device by using physical layer signaling. The second network device may alternatively send the power configuration parameters by using other possible signaling.

In this embodiment of the present invention, the first power configuration parameter is corresponding to a first antenna port group, the second power configuration parameter is corresponding to a second antenna port group, and the first power configuration parameter and the second power configuration parameter may be the same or different.

The first power configuration parameter and the second power configuration parameter may be carried in one piece of RRC signaling or MAC signaling and sent to the first network device, or carried in one piece of physical layer signaling and sent to the first network device; or may be carried in different RRC signaling or MAC signaling and sent to the first network device, or carried in different physical layer signaling and sent to the first network device. This is not limited in this embodiment of the present invention.

302. The first network device receives the first power configuration parameter and the second power configuration parameter.

303. The second network device sends reference signals and data to the first network device.

In this embodiment of the present invention, the reference signals may include a reference signal of the first antenna port group and a reference signal of the second antenna port group. The data may include data that is from the first antenna port group and data that is from the second antenna port group. The first antenna port group and the second antenna port group may belong to different cells, or may belong to a same cell. The first antenna port group and/or the second antenna port group include/includes at least one antenna port.

Optionally, the first antenna port group and the second antenna port group may belong to different base stations. For example, in a single-link case, the first antenna port group belongs to a base station 1, and the second antenna port group belongs to a base station 2. For example, in a dual-link case, the first antenna port group belongs to a base station 1, the second antenna port group belongs to a base station 2, and the first antenna port group and the second antenna port group perform coordinated transmission for a terminal device together; and in this case, if one antenna port group is one cell, the first antenna port group may be considered as a coordinated cell of the second antenna port group, and the second antenna port group may also be considered as a coordinated cell of the first antenna port group.

Optionally, the first antenna port group and the second antenna port group may belong to a same base station. For example, in a single-link case, the first antenna port group belongs to a base station 1, and the second antenna port group also belongs to the base station 1. For example, in a dual-link case, the first antenna port group belongs to a base station 1, the second antenna port group also belongs to the base station 1, and the first antenna port group and the second antenna port group perform coordinated transmission for a terminal device together; and in this case, if one antenna port group is one cell, the first antenna port group may be considered as a coordinated cell of the second antenna port group, and the second antenna port group may also be considered as a coordinated cell of the first antenna port group.

Optionally, the reference signal includes at least one of a demodulation reference signal and a first reference signal, and the first reference signal includes at least one of a BRS, an MRS, and a synchronization signal. A specific type of the reference signal may be preset in a protocol, or may be selected by the second network device according to a requirement. This is not limited in this embodiment of the present invention.

It should be noted that, the first reference signal may not be limited to the foregoing reference signals, and may alternatively be another signal. This is not limited in this embodiment of the present invention.

Optionally, any power configuration parameter may include at least one of a beam identifier, a beam antenna port, a reference signal power, and a power ratio. The power ratio may include at least one of the following:

(1) a ratio of a power of data of an antenna port group of a demodulation reference signal on a symbol on which a demodulation reference signal exists to a power of the demodulation reference signal of the antenna port group;

(2) a ratio of a power of data of an antenna port group of a demodulation reference signal on a symbol on which a demodulation reference signal exists to a power of a BRS and/or an MRS and/or a synchronization signal;

(3) a ratio of a power of data of an antenna port group of a demodulation reference signal on a symbol on which no demodulation reference signal exists to a power of the demodulation reference signal of the antenna port group;

(4) a ratio of a power of data of an antenna port group of a demodulation reference signal on a symbol on which no demodulation reference signal exists to a power of data of an antenna port group of a demodulation reference signal on a symbol on which a demodulation reference signal exists; and (5) a ratio of a power of data of an antenna port group of a demodulation reference signal on a symbol on which no demodulation reference signal exists to a power of a BRS and/or an MRS and/or a synchronization signal.

It should be noted that, the second network device may pre-configure a beam identifier and a power ratio for each beam antenna port, and bind the three pieces of information. The second network device needs to notify the first network device of only any one of the beam identifier, the beam antenna port, and the power ratio, and the first network device can learn of other information. Alternatively, one or more of the beam antenna port, the beam identifier, and the power ratio may be pre-defined.

304. The first network device receives the reference signals and the data.

305. The first network device determines a first power of received data based on the first power configuration parameter and the reference signal of the first antenna port group, and determines a second power of received data based on the second power configuration parameter and the reference signal of the second antenna port group.

In this embodiment of the present invention, after receiving the first power configuration parameter, the second power configuration parameter, the reference signal of the first antenna port group, the reference signal of the second antenna port group, the data that is from the first antenna port group, and the data that is from the second antenna port group, the first network device may determine, based on the first power configuration parameter and the reference signal of the first antenna port group, the first power of the data corresponding to the first antenna port group (namely, the data that is from the first antenna port group), and determine, based on the second power configuration parameter and the reference signal of the second antenna port group, the second power of the data corresponding to the second antenna port group (namely, the data that is from the second antenna port group).

In other words, for data that is from a demodulation reference signal antenna port, a power of the data that is from the antenna port and that is on a symbol on which a demodulation reference signal of the antenna port exists is determined based on the demodulation reference signal of the antenna port. For example, a power ratio is Pa, and may be 0 dB, −3 dB, or another value. The power ratio may be pre-defined, or may be notified by the second network device to the first network device. The first network device may learn, according to a protocol or based on the received power ratio, and based on a power of the demodulation reference signal of the antenna port, of the power of the data that is from the antenna port and that is on the symbol on which the demodulation reference signal of the antenna port exists, and further decode and demodulate the data to implement data reception.

For data that is from a demodulation reference signal antenna port, there are the following three cases for a power of data on a symbol on which no demodulation reference signal exists.

(1) The power of the data that is from the antenna port and that is on the symbol on which no demodulation reference signal of the antenna port exists is determined based on a power of the demodulation reference signal of the antenna port. For example, a power ratio is Pb, and may be pre-defined, or may be notified by the second network device to the first network device. The first network device may learn, according to a protocol or based on the received power ratio, and based on the power of the demodulation reference signal of the antenna port, of the power of the data that is from the antenna port and that is on the symbol on which no demodulation reference signal of the antenna port exists, and further decode and demodulate the data to implement data reception.

(2) The power of the data that is from the antenna port and that is on the symbol on which no demodulation reference signal of the antenna port exists is determined based on a power of data that is from the antenna port and that is on a symbol on which a demodulation reference signal of the antenna port exists. For example, a power ratio is Pc, and may be pre-defined, or may be notified by the second network device to the first network device. The first network device may learn, according to a protocol or based on the received power ratio, and based on the power of the data on the symbol on which the demodulation reference signal of the antenna port exists, of the power of the data that is from the antenna port and that is on the symbol on which no demodulation reference signal of the antenna port exists, and further decode and demodulate the data to implement data reception.

(3) A power of data that is from each antenna port is determined based on a power of another reference signal. For example, the another reference signal is a reference signal, such as a BRS, an MRS, or a synchronization signal, sent by another port/beam; or another reference signal sent by a same port/beam. For example, a power ratio is pd, and may be pre-defined, or may be notified by the second network device to the first network device. The first network device may learn, according to a protocol or based on the received power ratio, and based on a power of a reference signal on another port/beam, of the power of the data that is from the antenna port and that is on the symbol on which no demodulation reference signal of the antenna port exists, and further decode and demodulate the data to implement data reception.

It can be learned that, in the method shown in FIG. 3, the second network device may send a plurality of power configuration parameters to the first network device, and send reference signals and data of corresponding antenna port groups, so that the first network device determines, based on a power configuration parameter and a power of a reference signal that are corresponding to an antenna port group, a power of data that is from the antenna port group, and demodulates the data, thereby improving demodulation accuracy.

Figure 4:
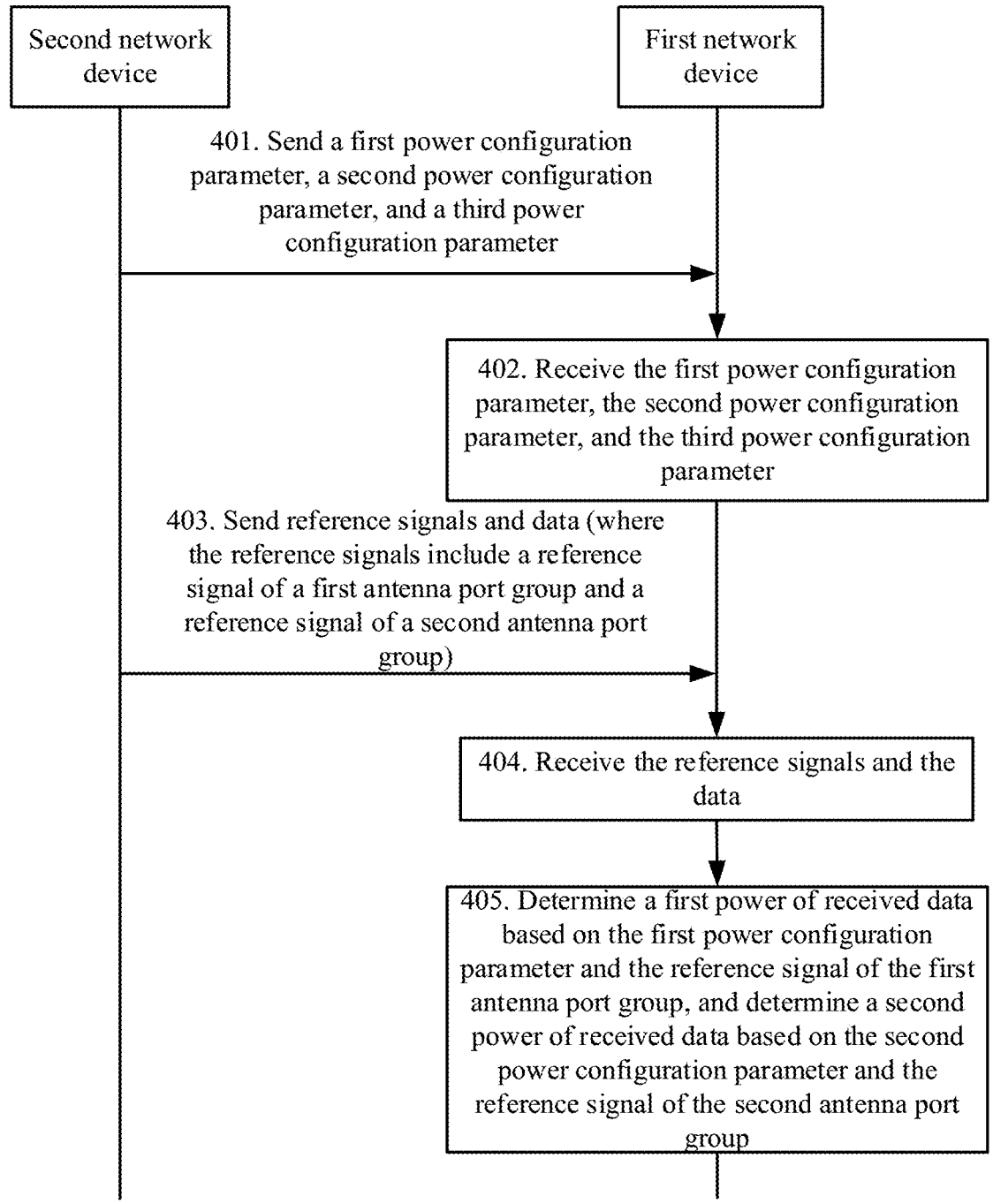
FIG. 4 is a schematic flowchart of still another power configuration method according to an embodiment of the present invention.

FIG. 4 is a schematic flowchart of still another power configuration method according to an embodiment of the present invention. As shown in FIG. 4, the power configuration method may include the following steps.

401. A second network device sends a first power configuration parameter, a second power configuration parameter, and a third power configuration parameter to a first network device.

In this embodiment of the present invention, the first power configuration parameter, the second power configuration parameter, and the third power configuration parameter may be sent to the first network device by using same RRC signaling and/or MAC signaling, and/or sent to the first network device by using same physical layer signaling; or may be sent to the first network device by using different RRC signaling and/or MAC signaling, and/or sent to the first network device by using different physical layer signaling. For example, if one antenna port group is considered as one cell, the second network device is a base station, and the first network device is a terminal device, a power configuration parameter of a serving cell may be added by the base station to one piece of RRC signaling and sent to the terminal device, and a power configuration parameter of another cell may be added to other RRC signaling and sent to the terminal device.

The second network device sends a plurality of power configuration parameters by using one piece of signaling, so that a quantity of signaling interactions can be reduced, and the first network device can directly obtain the plurality of power configuration parameters based on the one piece of signaling. This manner is relatively simple.

The first power configuration parameter, the second power configuration parameter, and the third power configuration parameter may be sent in a same time unit, or may be sent in different time units. This is not limited in this embodiment of the present invention.

It should be noted that, this embodiment of the present invention is not limited to only three power configuration parameters. In other words, the second network device may send a plurality of power configuration parameters to the first network device in advance. It can be further understood that, the third power configuration parameter is not limited to one power configuration parameter, and may be a power configuration parameter set including a plurality of power configuration parameters.

Optionally, for example, the second network device is a base station, and the first network device is a terminal device. If antenna port groups corresponding to a plurality of power configuration parameters belong to a same base station, the base station may directly obtain the plurality of power configuration parameters and send the plurality of power configuration parameters to the terminal device. However, if antenna port groups corresponding to a plurality of power configuration parameters belong to different base stations, a same base station may send the plurality of power configuration parameters to the terminal device. For example, a base station in which a serving cell of the terminal device is located may send the plurality of power configuration parameters to the terminal device. Alternatively, different base stations may separately send corresponding power configuration parameters to the terminal device, provided that the plurality of power configuration parameters are sent to the terminal device in total. Optionally, if a same base station sends the plurality of power configuration parameters to the terminal device, the base station that sends the power configuration parameters to the terminal device needs to obtain corresponding power configuration parameters from other base stations in advance.

For example, a first antenna port group corresponding to the first power configuration parameter belongs to a base station 1, and a second antenna port group corresponding to the second power configuration parameter belongs to a base station 2. If the base station 1 sends the two power configuration parameters to the terminal device, the base station 1 needs to send the first power configuration parameter to the terminal device, and the base station 1 may request the second power configuration parameter from the base station 2, for example, over an X2 interface, or the base station 2 may proactively send the second power configuration parameter to the base station 1. Alternatively, the base station 1 may send the first power configuration parameter to the terminal device, and the base station 2 sends the second power configuration parameter to the terminal device.

Optionally, if the first power configuration parameter, the second power configuration parameter, and the third power configuration parameter are added to a plurality of pieces of RRC signaling and/or MAC signaling and separately sent to the terminal device, and/or added to a plurality of pieces of physical layer signaling and separately sent to the terminal device, a time and a sequence of sending the first power configuration parameter, the second power configuration parameter, and the third power configuration parameter are not limited in this embodiment of the present invention.

402. The first network device receives the first power configuration parameter, the second power configuration parameter, and the third power configuration parameter.

403. The second network device sends reference signals and data to the first network device.

The reference signals include a reference signal of the first antenna port group and a reference signal of the second antenna port group. A power of the reference signal of the first antenna port group and a power of the reference signal of the second antenna port group may be the same or different. This is not limited in this embodiment of the present invention.

404. The first network device receives the reference signals and the data.

405. The first network device determines a first power of received data based on the first power configuration parameter and a reference signal of a first antenna port group, and determines a second power of received data based on the second power configuration parameter and a reference signal of a second antenna port group.

In this embodiment of the present invention, the second network device may send a plurality of power configuration parameters to the first network device in advance, and each power configuration parameter is corresponding to an antenna port group. When receiving data from some antenna port groups, the first network device may determine, based on corresponding power configuration parameters and reference signals, powers of the data that is from the antenna port groups.

Optionally, each antenna port group is corresponding to at least one codeword and/or transmission layer. To be specific, each antenna port group may be used to transmit at least one codeword, or a plurality of antenna ports may be used to transmit one codeword, and different antenna port groups may be corresponding to different transmission layers of a same codeword; one codeword may be corresponding to data of one transmission layer or a plurality of transmission layers; and each antenna port group may alternatively be used to transmit data of at least one transmission layer, or a plurality of antenna port groups may alternatively be used to transmit data of a same transmission layer. For example, in diversity transmission, two antenna ports are configured to transmit data of one transmission layer. In this case, the two antenna ports may transmit different coding information, such as almuta, of the data of the transmission layer.

A correspondence between an antenna port group and a codeword and/or a transmission layer may be indicated by the second network device in DCI, or may be pre-defined, or may be notified by using RRC signaling, MAC signaling, or physical layer signaling. This is not limited in this embodiment of the present invention.

It can be understood that, a transmission time interval may be relatively long if the RRC signaling is used, and the RRC signaling may be used to semi-statically configure a power configuration parameter, and is applicable to a scenario with a slow change, to reduce signaling overheads. DCI signaling can implement dynamic configuration, and is applicable to a scenario with a fast change, where signaling overheads need to be further considered. Therefore, a two-level indication may alternatively be used. A plurality of pieces of signaling may be pre-configured, and a further indication is provided during specific use. This is a compromised implementation of the foregoing two manners, and a configuration interval and signaling overheads are moderate. At a first level, RRC signaling, MAC signaling, or physical layer signaling may be used, and at a second level, RRC signaling, MAC signaling, or physical layer signaling may also be used. A same type or different types of signaling or other signaling may be used for the two levels. This is not limited in this embodiment of the present invention.

Further, different power configurations are performed for different codewords, so as to improve codeword decoding performance. A same power configuration may be set in one codeword, so as to reduce signaling overheads. Different power configurations are performed for different transmission layers, so as to improve transmission performance at different layers. Different power configurations are provided for an antenna port group, so as to reduce signaling overheads when one antenna port group includes a plurality of antenna ports.

Optionally, the second network device may further send, to the first network device, information that is used to indicate a correspondence between a power configuration parameter and at least one of a quantity of transmission layers, an antenna port, a codeword, and a scrambling identity (Scrambling Identity, SCID), so that the first network device receives the information. In other words, at least one of a quantity of transmission layers, an antenna port, a codeword, and a scrambling identity is bound to a power configuration parameter. For example, table information is established, and the second network device sends the table information to the first network device by using physical layer signaling, so that when receiving data corresponding to a specific transmission layer, antenna port, codeword, and/or scrambling identity, the first network device may determine a power of the received data based on a bound power configuration parameter.

Optionally, each power configuration parameter may further include a power configuration identifier used to indicate the power configuration parameter. The power configuration identifier may also be referred to as index information. The second network device may further send, to the first network device, information that is used to indicate a correspondence between a power configuration identifier and at least one of a quantity of transmission layers, an antenna port, a codeword, and a scrambling identity, so that the first network device receives the information.

According to this embodiment of the present invention, the second network device does not need to carry each power configuration parameter in signaling, but only needs to set a power configuration identifier used to indicate the power configuration parameter, and carry the power configuration identifier in the signaling. Generally, a data amount of a power configuration identifier may be smaller than that of a corresponding power configuration parameter. In this way, a data amount carried by signaling can be reduced.

Specifically, the second network device may send, to the first network device through a physical downlink control channel (PDCCH) or an enhanced physical downlink control channel (EPDCCH), the information about a correspondence between a power configuration parameter or a power configuration identifier and at least one of a quantity of transmission layers, an antenna port, a codeword, and a scrambling identity.

For example, it is assumed that the first network device is a terminal device, and the second network device is a base station. The base station may indicate, in DCI, a power configuration parameter (a power ratio) corresponding to a quantity of transmission layers or an antenna port. For example, one bit is added for each transmission layer/port, to indicate whether there is a power difference. Specifically, "Power of antenna port(s)/layer(s)—X bits" may be added. A bit value of 0 indicates that there is no power difference, that is, a ratio of a power of data of the port to a power of a reference signal of the port is 0 dB; and a bit value of 1 indicates that there is a power difference, that is, a ratio of a power of data of the port to a power of a reference signal of the port is −3 dB or another value. Alternatively, a bit value of 0 indicates that there is a power difference, and a bit value of 1 indicates that there is no power difference. X may be determined based on a quantity of ports or a quantity of transmission layers that is indicated in the DCI, or may be pre-defined, or may be notified by using other signaling, such as RRC signaling. Alternatively, X is a fixed value, for example, is determined based on a maximum quantity of transmission layers of the terminal device. For example, X is 8 bits when there are a maximum of eight layers. When a current quantity of transmission layers of the terminal device is less than 8, 0 may be used for supplementation.

For example, the base station may indicate, in DCI, a power configuration parameter (a power ratio) corresponding to a codeword. For example, one bit is configured for a codeword 1, to indicate whether there is a power difference for data on an antenna port of the codeword 1, and one bit is configured for a codeword 2, to indicate whether there is a power difference for data on an antenna port of the codeword 2. Specifically, one codeword may be corresponding to one piece of indication information, or a plurality of codewords are jointly corresponding to one piece of indication information. Specifically, "Power ratio of codeword—X bits" may be added. A bit value of 0 indicates that there is no power difference, that is, a ratio of a power of data of the codeword to a power of a reference signal is 0 dB; and a bit value of 1 indicates that there is a power difference, that is, a ratio of a power of data of the codeword to a power of a reference signal is −3 dB or another value. The opposite is also true. When one codeword is corresponding to one piece of indication information "Power ratio of codeword", the indication information may be placed in a codeword information field, where each codeword information field includes one piece of indication information. In this case, X may be 1. A specific quantity of indication information may be determined based on a quantity of codewords in the DCI, or may be pre-defined, or may be notified by using other signaling, such as RRC signalling. Alternatively, a plurality of codewords may be jointly corresponding to one piece of indication information. In this case, X may be determined based on a quantity of codewords included in the DCI, or may be pre-defined, or may be notified by using other signaling, such as RRC signaling. Alternatively, X is a fixed value, for example, is determined based on a maximum quantity of codewords of the terminal device. For example, X is 2 bits when there are a maximum of two codewords. Therefore, a first bit is used to indicate a power configuration parameter corresponding to a first codeword, and the second bit is used to indicate a power configuration parameter corresponding to a second codeword. When a current quantity of codewords of the terminal device is less than 2, 0 may be used for supplementation.

Alternatively, the second network device may send, to the first network device through a PDCCH or an EPDCCH, information about a correspondence between a transmission point and a power configuration parameter or a power configuration identifier.

For example, it is assumed that the first network device is a terminal device, and the second network device is a base station. The base station may indicate, in DCI, a power configuration parameter (a power ratio) corresponding to a transmission point. For example, one bit is configured for data of each transmission point, to indicate whether there is a power difference. Specifically, "Power of Transmission Point—X bits" may be added. A bit value of 0 indicates that there is no power difference, that is, a ratio of a power of data that is from the transmission point to a power of a reference signal is 0 dB; and a bit value of 1 indicates that there is a power difference, that is, a ratio of a power of data that is from the transmission point to a power of a reference signal is −3 dB or another value. The opposite is also true. When one transmission point is corresponding to one piece of indication information "Power of Transmission Point", the indication information may be placed in a transmission point information field, where each transmission point information field includes one piece of indication information. In this case, X may be 1. A specific quantity of indication information may be determined based on a quantity of transmission points in the DCI, or may be pre-defined, or may be notified by using other signaling, such as RRC signaling. Alternatively, a plurality of transmission points may be jointly corresponding to one piece of indication information. In this case, X may be determined based on a quantity of transmission points included in the DCI, or may be pre-defined, or may be notified by using other signaling, such as RRC signaling. Alternatively, X is a fixed value, for example, is determined based on a maximum quantity of transmission points supported by the terminal device. For example, X is 2 bits when there are a maximum of two transmission points. Therefore, a first bit is used to indicate a power configuration parameter corresponding to a first transmission point, and a second bit is used to indicate a power configuration parameter corresponding to a second transmission point. When a current quantity of transmission points of the terminal device is less than 2, 0 may be used for supplementation.

For example, a power configuration parameter, such as a power ratio, may be determined in an implicit manner. Specifically, the power configuration parameter (the power ratio) may be determined based on layer quantity information (or antenna port quantity information) corresponding to demodulation reference signal antenna port group information (or codeword information or quasi co-location indication information or transmission point information). The quasi co-location indication information is used to indicate QCL information of an antenna port of a demodulation reference signal, for example, a QCL relationship with an antenna port of another reference signal. The another reference signal may be a CRS, a channel state information reference signal (CSI-RS), a BRS, an MRS, or the like.

For example, a power configuration parameter (a power ratio) is determined based on layer quantity information corresponding to demodulation reference signal antenna port group information (or codeword quantity information or quasi co-location indication information). Specifically, for one or more pieces of demodulation reference signal antenna port group information, if a quantity of layers of data sent by one or more antenna ports in a demodulation reference signal antenna port group (or a quantity of antenna ports, in the antenna port group, used for sending data) is greater than 2 (or another fixed value, or a value configured by a network side), there is a power ratio, such as −3 dB, of a power of the data sent by the one or more antenna ports to a power of a reference signal sent by the one or more antenna ports; or if a quantity of layers of data sent by one or more antenna ports in the antenna port group (or a quantity of antenna ports, in the antenna port group, used for sending data) is less than or equal to 2 (or another fixed value, or a value configured by a network side), there is a power ratio, such as 0 dB, of a power of the data sent by the one or more antenna ports to a power of a reference signal sent by the one or more antenna ports. If a plurality of pieces of demodulation reference signal antenna port group information are configured for UE, a power ratio is determined based on layer quantity information corresponding to each piece of demodulation reference signal antenna port group information (or a quantity of antenna ports, in each antenna port group, used for sending data). A specific value of the power ratio is not limited herein.

Specifically, for the codeword information, if one or more codewords are configured for UE, a power configuration parameter (a power ratio) is determined for each codeword based on layer quantity information corresponding to the codeword (or information about a quantity of antenna ports used for sending the codeword). Specifically, for one or more pieces of codeword information, if a quantity of layers corresponding to the codeword (or information about a quantity of antenna ports used for sending the codeword) is greater than 2 (or another fixed value, or a value configured by a network side), there is a power ratio, such as −3 dB, of a power of data corresponding to the codeword to a power of a reference signal sent by one or more antenna ports corresponding to the codeword; or if a quantity of layers of data corresponding to the codeword (or information about a quantity of antenna ports used for sending the codeword) is less than or equal to 2 (or another fixed value, or a value configured by a network side), there is a power ratio, such as 0 dB, of a power of data corresponding to the codeword to a power of a reference signal sent by one or more antenna ports corresponding to the codeword. If a plurality of pieces of codeword information are configured for the UE, a power ratio is determined based on layer quantity information corresponding to each codeword (or information about a quantity of antenna ports used for sending each codeword). A specific value of the power ratio is not limited herein.

The quantity of layers corresponding to the codeword may be a quantity of layers used for sending the codeword. For example, if one codeword has two layers, a quantity of layers corresponding to the codeword is 2. The one or more antenna ports corresponding to the codeword may be one or more antenna ports used for sending the codeword.

Specifically, for the quasi co-location indication information, if one or more pieces of quasi co-location indication information are configured for UE, a power configuration parameter (a power ratio) is determined for each piece of quasi co-location indication information based on layer quantity information corresponding to the quasi co-location indication information (or a quantity of antenna ports used for data corresponding to the quasi co-location indication information). Specifically, for one or more pieces of quasi co-location indication information, if a quantity of layers corresponding to the quasi co-location indication information (or a quantity of antenna ports used for data corresponding to the quasi co-location indication information) is greater than 2 (or another fixed value, or a value configured by a network side), there is a power ratio, such as −3 dB, of a power of the data corresponding to the quasi co-location indication information to a power of a reference signal sent by one or more antenna ports that send the data; or if a quantity of layers corresponding to the quasi co-location indication information (or a quantity of antenna ports used for data corresponding to the quasi co-location indication information) is less than or equal to 2 (or another fixed value, or a value configured by a network side), there is a power ratio, such as 0 dB, of a power of the data corresponding to the quasi co-location indication information to a power of a reference signal sent by one or more antenna ports that send the data. If a plurality of pieces of quasi co-location indication information are configured for the UE, a power ratio is determined based on layer quantity information corresponding to each piece of quasi co-location indication information (or a quantity of antenna ports used for data corresponding to the quasi co-location indication information). A specific value of the power ratio is not limited herein, and may be pre-defined, or notified by using signaling.

The layer quantity information corresponding to the quasi co-location indication information may be layer quantity information corresponding to data sent by an antenna port in the quasi co-location indication information. The quantity of antenna ports used for the data corresponding to the quasi co-location indication information may be a quantity of antenna ports that are used when the antenna port in the quasi co-location indication information sends the data.

Specifically, for the transmission point information, if one or more pieces of transmission point information are configured for UE, a power configuration parameter (a power ratio) is determined for each piece of transmission point information based on layer quantity information corresponding to the transmission point (or information about a quantity of antenna ports used by the transmission point for sending data). Specifically, for the one or more pieces of transmission point information, if a quantity of layers corresponding to the transmission point (or information about a quantity of antenna ports used by the transmission point for sending data) is greater than 2 (or another fixed value, or a value configured by a network side), there is a power ratio, such as −3 dB, of a power of data corresponding to the transmission point to a power of a reference signal sent by one or more antenna ports corresponding to the data sent by the transmission point; or if a quantity of layers of data corresponding to the transmission point (or information about a quantity of antenna ports used by the transmission point for sending data) is less than or equal to 2 (or another fixed value, or a value configured by a network side), there is a power ratio, such as 0 dB, of a power of the data corresponding to the transmission point to a power of a reference signal sent by one or more antenna ports corresponding to the data sent by the transmission point. If a plurality of pieces of transmission point information are configured for the UE, a power ratio is determined based on layer quantity information corresponding to each transmission point (or information about a quantity of antenna ports used by the transmission point for sending data). A specific value of the power ratio is not limited herein.

The quantity of layers corresponding to the transmission point may be a quantity of layers corresponding to the data sent by the transmission point. For example, if one transmission point sends two layers of data, a quantity of layers corresponding to the transmission point is 2. The one or more antenna ports corresponding to the data may be one or more antenna ports used for sending the data.

Further, for example, a power configuration parameter, such as a power ratio, may be determined in an implicit manner. For example, a power configuration parameter (a power ratio) may be determined based on layer quantity information (or antenna port quantity information) and demodulation reference signal antenna port pattern information that are corresponding to demodulation reference signal antenna port group information (or codeword information or quasi co-location indication information or transmission point information). The quasi co-location indication information is used to indicate QCL information of an antenna port of a demodulation reference signal, for example, a QCL relationship with an antenna port of another reference signal. The another reference signal may be at least one of a CRS, a channel state information reference signal (CSI-RS), a BRS, an MRS, and the like.

Optionally, a power configuration parameter (a power ratio) is determined based on layer quantity information and demodulation reference signal antenna port pattern information that are corresponding to demodulation reference signal antenna port group information (or codeword quantity information or quasi co-location indication information). For example, for one or more pieces of demodulation reference signal antenna port group information, if a quantity of layers of data sent by one or more antenna ports in the demodulation reference signal antenna port group (or a quantity of antenna ports, in the antenna port group, used for sending data) is greater than or equal to a threshold (specified in a protocol, or configured by a network side, for example, 2), and demodulation reference signal antenna port patterns corresponding to different layers (or different antenna ports) are different, there is a power ratio, such as −3 dB, of a power of the data sent by the one or more antenna ports to a power of a reference signal sent by the one or more antenna ports; or if a quantity of layers of data sent by one or more antenna ports in the antenna port group (or a quantity of antenna ports, in the antenna port group, used for sending data) is less than a threshold (specified in a protocol, or configured by a network side, for example, 2), or a quantity of layers is greater than or equal to a threshold (specified in a protocol, or configured by a network side, for example, 2) but demodulation reference signal antenna port patterns corresponding to different layers (or different antenna ports) are the same, there is a power ratio, such as 0 dB, of a power of the data sent by the one or more antenna ports to a power of a reference signal sent by the one or more antenna ports. If a plurality of pieces of demodulation reference signal antenna port group information are configured for UE, a power ratio is determined based on layer quantity information (or a quantity of antenna ports, in each antenna port group, used for sending data) and demodulation reference signal antenna port pattern information that are corresponding to each piece of demodulation reference signal antenna port group information. A specific value of the power ratio is not limited herein. In the foregoing cases, the thresholds may be the same or different, and the threshold corresponding to the quantity of antenna ports and the threshold corresponding to the quantity of layers may be the same or different. This is not limited herein.

Optionally, for the codeword information, if one or more codewords are configured for UE, a power configuration parameter (a power ratio) is determined for each codeword based on layer quantity information (or information about a quantity of antenna ports used for sending the codeword) and demodulation reference signal antenna port pattern information that are corresponding to the codeword. Optionally, for one or more pieces of codeword information, if a quantity of layers corresponding to the codeword (or information about a quantity of antenna ports used for sending the codeword) is greater than or equal to a threshold (specified in a protocol, or configured by a network side, for example, 2) and demodulation reference signal antenna port patterns corresponding to different layers (or different antenna ports) are different, there is a power ratio, such as −3 dB, of a power of data corresponding to the codeword to a power of a reference signal sent by one or more antenna ports corresponding to the codeword; or if a quantity of layers of data corresponding to the codeword (or information about a quantity of antenna ports used for sending the codeword) is less than a threshold (specified in a protocol, or configured by a network side, for example, 2), or a quantity of layers is greater than or equal to 2 but demodulation reference signal antenna port patterns corresponding to different layers (or different antenna ports) are the same, there is a power ratio, such as 0 dB, of a power of the data corresponding to the codeword to a power of a reference signal sent by one or more antenna ports corresponding to the codeword. If a plurality of pieces of codeword information are configured for the UE, a power ratio is determined based on layer quantity information (or information about a quantity of antenna ports used for sending each codeword) and demodulation reference signal antenna port pattern information that are corresponding to each codeword. A specific value of the power ratio is not limited herein. In the foregoing cases, the thresholds may be the same or different, and the threshold corresponding to the quantity of antenna ports used for the codeword and the threshold corresponding to the quantity of layers may be the same or different. This is not limited herein.

The quantity of layers corresponding to the codeword may be a quantity of layers used for sending the codeword. For example, if one codeword has two layers, a quantity of layers corresponding to the codeword is 2. The one or more antenna ports corresponding to the codeword may be one or more antenna ports used for sending the codeword.

Optionally, for the quasi co-location indication information, if one or more pieces of quasi co-location indication information are configured for UE, a power configuration parameter (a power ratio) is determined for each piece of quasi co-location indication information based on layer quantity information (or a quantity of antenna ports used for data corresponding to the quasi co-location indication information) and demodulation reference signal antenna port pattern information that are corresponding to the quasi co-location indication information. Optionally, for one or more pieces of quasi co-location indication information, if a quantity of layers corresponding to the quasi co-location indication information (or a quantity of antenna ports used for data corresponding to the quasi co-location indication information) is greater than or equal to a threshold (specified in a protocol, or configured by a network side, and for example, 2), and demodulation reference signal antenna port patterns corresponding to different layers (or different antenna ports) are different, there is a power ratio, such as −3 dB, of a power of the data corresponding to the quasi co-location indication information to a power of a reference signal sent by one or more antenna ports that send the data; or if a quantity of layers corresponding to the quasi co-location indication information (or a quantity of antenna ports used for data corresponding to the quasi co-location indication information) is less than a threshold (specified in a protocol, or configured by a network side, and for example, 2), or a quantity of layers is greater than or equal to a threshold (specified in a protocol, or configured by a network side, and for example, 2) but demodulation reference signal antenna port patterns corresponding to different layers (or different antenna ports) are the same, there is a power ratio, such as 0 dB, of a power of the data corresponding to the quasi co-location indication information to a power of a reference signal sent by one or more antenna ports that send the data. If a plurality of pieces of quasi co-location indication information are configured for the UE, a power ratio is determined based on layer quantity information corresponding to each piece of quasi co-location indication information (or a quantity of antenna ports used for data corresponding to the quasi co-location indication information) and demodulation reference signal antenna port pattern information corresponding to the quasi co-location indication information. A specific value of the power ratio is not limited herein, and may be pre-defined, or notified by using signaling. In the foregoing cases, the thresholds may be the same or different, and the threshold corresponding to the quantity of antenna ports used for the data corresponding to the quasi co-location indication information and the threshold corresponding to the quantity of layers may be the same or different. This is not limited herein.

The layer quantity information corresponding to the quasi co-location indication information may be layer quantity information corresponding to data sent by an antenna port in the quasi co-location indication information. The quantity of antenna ports used for the data corresponding to the quasi co-location indication information may be a quantity of antenna ports that are used when the antenna port in the quasi co-location indication information sends the data.

Optionally, for the transmission point information, if one or more pieces of transmission point information are configured for UE, a power configuration parameter (a power ratio) is determined for each piece of transmission point information based on layer quantity information corresponding to the transmission point (or information about a quantity of antenna ports used by the transmission point for sending data) and demodulation reference signal antenna port pattern information corresponding to the transmission point. Specifically, for one or more pieces of transmission point information, if a quantity of layers corresponding to the transmission point (or information about a quantity of antenna ports used by the transmission point for sending data) is greater than or equal to a threshold (specified in a protocol, or configured by a network side, for example, 2), and demodulation reference signal antenna port patterns corresponding to different layers (or different antenna ports) are different, there is a power ratio, such as −3 dB, of a power of data corresponding to the transmission point to a power of a reference signal sent by one or more antenna ports corresponding to the data sent by the transmission point; or if a quantity of layers corresponding to the transmission point (or information about a quantity of antenna ports used by the transmission point for sending data) is less than a threshold (specified in a protocol, or configured by a network side, for example, 2), or a quantity of layers is greater than or equal to a threshold (specified in a protocol, or configured by a network side, for example, 2) but demodulation reference signal antenna port patterns corresponding to different layers (or different antenna ports) are the same, there is a power ratio, such as 0 dB, of a power of data corresponding to the transmission point to a power of a reference signal sent by one or more antenna ports corresponding to the data sent by the transmission point. If a plurality of pieces of transmission point information are configured for the UE, a power ratio is determined based on layer quantity information corresponding to each transmission point (or information about a quantity of antenna ports used by the transmission point for sending data) and demodulation reference signal antenna port pattern information corresponding to the transmission point. A specific value of the power ratio is not limited herein. In the foregoing cases, the thresholds may be the same or different, and the threshold corresponding to the quantity of antenna ports used by the transmission port for sending the data and the threshold corresponding to the quantity of layers may be the same or different. This is not limited herein.

The quantity of layers corresponding to the transmission point may be a quantity of layers corresponding to the data sent by the transmission point. For example, if one transmission point sends two layers of data, a quantity of layers corresponding to the transmission point is 2. The one or more antenna ports corresponding to the data may be one or more antenna ports used for sending the data.

Further, for example, a power configuration parameter, such as a power ratio, may be determined in another implicit manner. For example, a power configuration parameter (a power ratio) may be determined based on demodulation reference signal antenna port pattern information corresponding to demodulation reference signal antenna port group information (or codeword information or quasi co-location indication information or transmission point information). The quasi co-location indication information is used to indicate QCL information of an antenna port of a demodulation reference signal, for example, a QCL relationship with an antenna port of another reference signal. The another reference signal may be at least one of a CRS, a channel state information reference signal (CSI-RS), a BRS, an MRS, and the like.

Optionally, a power configuration parameter (a power ratio) is determined based on demodulation reference signal antenna port pattern information corresponding to demodulation reference signal antenna port group information (or codeword quantity information or quasi co-location indication information). Optionally, for one or more pieces of demodulation reference signal antenna port group information, if demodulation reference signal antenna port patterns corresponding to one or more antenna ports in the demodulation reference signal antenna port group are different, there is a power ratio, such as −3 dB, of a power of data sent by the one or more antenna ports to a power of a reference signal sent by the one or more antenna ports; or if demodulation reference signal antenna port patterns corresponding to one or more antenna ports in the antenna port group are the same, there is a power ratio, such as 0 dB, of a power of data sent by the one or more antenna ports to a power of a reference signal sent by the one or more antenna ports. If a plurality of pieces of demodulation reference signal antenna port group information are configured for UE, a power ratio is determined based on demodulation reference signal antenna port pattern information corresponding to each piece of demodulation reference signal antenna port group information. A specific value of the power ratio is not limited herein.

Optionally, for the codeword information, if one or more codewords are configured for UE, a power configuration parameter (a power ratio) is determined for each codeword based on demodulation reference signal antenna port pattern information corresponding to the codeword. Optionally, for one or more pieces of codeword information, if demodulation reference signal antenna port patterns corresponding to the codeword are different, there is a power ratio, such as −3 dB, of a power of data corresponding to the codeword to a power of a reference signal sent by one or more antenna ports corresponding to the codeword; or if demodulation reference signal antenna port patterns corresponding to the codeword are the same, there is a power ratio, such as 0 dB, of a power of data corresponding to the codeword to a power of a reference signal sent by one or more antenna ports corresponding to the codeword. If a plurality of pieces of codeword information are configured for the UE, a power ratio is determined based on demodulation reference signal antenna port pattern information corresponding to each codeword. A specific value of the power ratio is not limited herein.

The one or more antenna ports corresponding to the codeword may be one or more antenna ports used for sending the codeword.

Optionally, for the quasi co-location indication information, if one or more pieces of quasi co-location indication information are configured for UE, a power configuration parameter (a power ratio) is determined for each piece of quasi co-location indication information based on demodulation reference signal antenna port pattern information corresponding to the quasi co-location indication information. Optionally, for one or more pieces of quasi co-location indication information, if demodulation reference signal antenna port patterns corresponding to the quasi co-location indication information are different, there is a power ratio, such as −3 dB, of a power of data corresponding to the quasi co-location indication information to a power of a reference signal sent by one or more antenna ports that send the data; or if demodulation reference signal antenna port patterns corresponding to the quasi co-location indication information are the same, there is a power ratio, such as 0 dB, of a power of data corresponding to the quasi co-location indication information to a power of a reference signal sent by one or more antenna ports that send the data. If a plurality of pieces of quasi co-location indication information are configured for the UE, a power ratio is determined based on demodulation reference signal antenna port pattern information corresponding to each piece of quasi co-location indication information. A specific value of the power ratio is not limited herein, and may be pre-defined, or notified by using signaling.

The demodulation reference signal antenna port corresponding to the quasi co-location indication information may be a demodulation reference signal antenna port corresponding to data sent by an antenna port in the quasi co-location indication information. A quantity of antenna ports used for the data corresponding to the quasi co-location indication information may be a quantity of antenna ports that are used when the antenna port in the quasi co-location indication information sends the data.

Optionally, for the transmission point information, if one or more pieces of transmission point information are configured for UE, a power configuration parameter (a power ratio) is determined for each piece of transmission point information based on demodulation reference signal antenna port pattern information corresponding to the transmission point. Optionally, for one or more pieces of transmission point information, if demodulation reference signal antenna port patterns corresponding to the transmission point are different, there is a power ratio, such as −3 dB, of a power of data corresponding to the transmission point to a power of a reference signal sent by one or more antenna ports corresponding to the data sent by the transmission point; or if demodulation reference signal antenna port patterns corresponding to the transmission point are the same, there is a power ratio, such as 0 dB, of a power of data corresponding to the transmission point to a power of a reference signal sent by one or more antenna ports corresponding to the data sent by the transmission point. If a plurality of pieces of transmission point information are configured for the UE, a power ratio is determined based on demodulation reference signal antenna port pattern information corresponding to each transmission point. A specific value of the power ratio is not limited herein.

The demodulation reference signal antenna port corresponding to the transmission point may be a demodulation reference signal antenna port corresponding to the data sent by the transmission point. The one or more antenna ports corresponding to the data may be one or more antenna ports used for sending the data.

With reference to the foregoing embodiments, specifically, a demodulation reference signal in LTE system is used as an example, a same pattern is used for a port 7, a port 8, a port 11, and a port 13, that is, a same time-frequency resource position is occupied; and a same pattern is used for a port 9, a port 10, a port 12, and a port 14, that is, a same time-frequency resource position is occupied. Determining of a power configuration parameter (a power ratio) is described by using an example in which two transmission points transmit two codewords. A specific power configuration parameter is used only as an example for description, and constitutes no specific limitation.

For example, there may be the following three correspondences between a port number of an antenna port and a transmission point or a codeword or a QCL.

Manner 1: Port numbers 7, 8, 11, and 13 of antenna ports are corresponding to one transmission point or codeword or QCL; and port numbers 9, 10, 12, and 14 of antenna ports are corresponding to another transmission point or codeword or QCL. In this manner, because reference signal antenna port patterns corresponding to one or more antenna ports of each transmission point or codeword or QCL are the same, there is a power ratio, such as 0 dB, of a power of data corresponding to the transmission point or the codeword or the QCL indication information (QCL) to a power of a reference signal sent by one or more antenna ports corresponding to the data sent by the transmission point. Specifically, a power configuration parameter is determined as follows:

When there are two layers of data in total, a power configuration parameter (a power ratio) may be as follows:

| Transmission point/CW/QCL | Antenna port | Power configuration parameter (power ratio) |
| --- | --- | --- |
| Transmission point 1/CW 1/QCL 1 | 1 layer: port 7 | 0 dB |
| Transmission point 2/CW 2/QCL 2 | 1 layer: port 9 | 0 dB |

When there are three layers of data in total, a power configuration parameter (a power ratio) may be as follows:

| Transmission point/CW/QCL | Antenna port | Power configuration parameter (power ratio) |
| --- | --- | --- |
| Transmission point 1/CW 1/QCL 1 | 1 layer: port 7 | 0 dB |
| Transmission point 2/CW 2/QCL 2 | 2 layers: port 9, port 10 | 0 dB | or:

| Transmission point/CW/QCL | Antenna port | Power configuration parameter (power ratio) |
| --- | --- | --- |
| Transmission point 1/CW 1/QCL 1 | 2 layers: port 7, port 8 | 0 dB |
| Transmission point 2/CW 2/QCL 2 | 1 layer: port 9 | 0 dB |

When there are four layers of data in total, a power configuration parameter (a power ratio) may be as follows:

| Transmission point/CW/QCL | Antenna port | Power configuration parameter (power ratio) |
| --- | --- | --- |
| Transmission point 1/CW 1/QCL 1 | 1 layer: port 7 | 0 dB |
| Transmission point 2/CW 2/QCL 2 | 3 layers: port 9, port 10, port 12 | 0 dB | or:

| Transmission point/CW/QCL | Antenna port | Power configuration parameter (power ratio) |
| --- | --- | --- |
| Transmission point 1/CW 1/QCL 1 | 2 layers: port 7, port 8 | 0 dB |
| Transmission point 2/CW 2/QCL 2 | 2 layers: port 9, port 10 | 0 dB | or:

| Transmission point/CW/QCL | Antenna port | Power configuration parameter (power ratio) |
| --- | --- | --- |
| Transmission point 1/CW 1/QCL 1 | 3 layers: port 7, port 8, port 11 | 0 dB |
| Transmission point 2/CW 2/QCL 2 | 1 layer: port 9 | 0 dB |

When there are five layers of data in total, a power configuration parameter (a power ratio) may be as follows:

| Transmission point/CW/QCL | Antenna port | Power configuration parameter (power ratio) |
| --- | --- | --- |
| Transmission point 1/CW 1/QCL 1 | 1 layer: port 7 | 0 dB |
| Transmission point 2/CW 2/QCL 2 | 4 layers: port 9, port 10, port 12, port 14 | 0 dB | or:

| Transmission point/CW/QCL | Antenna port | Power configuration parameter (power ratio) |
| --- | --- | --- |
| Transmission point 1/CW 1/QCL 1 | 2 layers: port 7, port 8 | 0 dB |
| Transmission point 2/CW 2/QCL 2 | 3 layers: port 9, port 10, port 12 | 0 dB | or:

| Transmission point/CW/QCL | Antenna port | Power configuration parameter (power ratio) |
| --- | --- | --- |
| Transmission point 1/CW 1/QCL 1 | 3 layers: port 7, port 8, port 11 | 0 dB |
| Transmission point 2/CW 2/QCL 2 | 2 layers: port 9, port 10 | 0 dB | or:

| Transmission point/CW/QCL | Antenna port | Power configuration parameter (power ratio) |
| --- | --- | --- |
| Transmission point 1/CW 1/QCL 1 | 4 layers: port 7, port 8, port 11, port 13 | 0 dB |
| Transmission point 2/CW 2/QCL 2 | 1 layer: port 9 | 0 dB |

When there are six layers of data in total, a power configuration parameter (a power ratio) may be as follows:

| Transmission point/CW/QCL | Antenna port | Power configuration parameter (power ratio) |
| --- | --- | --- |
| Transmission point 1/CW 1/QCL 1 | 2 layers: port 7, port 8 | 0 dB |
| Transmission point 2/CW 2/QCL 2 | 4 layers: port 9, port 10, port 12, port 14 | 0 dB | or:

| Transmission point/CW/QCL | Antenna port | Power configuration parameter (power ratio) |
| --- | --- | --- |
| Transmission point 1/CW 1/QCL 1 | 3 layers: port 7, port 8, port 11 | 0 dB |
| Transmission point 2/CW 2/QCL 2 | 3 layers: port 9, port 10, port 12 | 0 dB | or:

| Transmission point/CW/QCL | Antenna port | Power configuration parameter (power ratio) |
|---|---|---|
| Transmission point 1/CW 1/QCL 1 | 4 layers: port 7, port 8, port 11, port 13 | 0 dB |
| Transmission point 2/CW 2/QCL 2 | 2 layers: port 9, port 10 | 0 dB |

When there are seven layers of data in total, a power configuration parameter (a power ratio) may be as follows:

| Transmission point/CW/QCL | Antenna port | Power configuration parameter (power ratio) |
|---|---|---|
| Transmission point 1/CW 1/QCL 1 | 3 layers: port 7, port 8, port 11 | 0 dB |
| Transmission point 2/CW 2/QCL 2 | 4 layers: port 9, port 10, port 12, port 14 | 0 dB | or:

| Transmission point/CW/QCL | Antenna port | Power configuration parameter (power ratio) |
|---|---|---|
| Transmission point 1/CW 1/QCL 1 | 4 layers: port 7, port 8, port 11, port 13 | 0 dB |
| Transmission point 2/CW 2/QCL 2 | 3 layers: port 9, port 10, port 12 | 0 dB |

When there are eight layers of data in total, a power configuration parameter (a power ratio) may be as follows:

| Transmission point/CW/QCL | Antenna port | Power configuration parameter (power ratio) |
|---|---|---|
| Transmission point 1/CW 1/QCL 1 | 4 layers: port 7, port 8, port 11, port 13 | 0 dB |
| Transmission point 2/CW 2/QCL 2 | 4 layers: port 9, port 10, port 12, port 14 | 0 dB |

Manner 2: Port numbers 7, 8, 9, and 10 of antenna ports are corresponding to one transmission point or codeword or QCL; and port numbers 11, 12, 13, and 14 of antenna ports are corresponding to another transmission point or codeword or QCL. In this manner, because reference signal antenna port patterns corresponding to one or more antenna ports of each transmission point or codeword or QCL may be the same or different, there may be different power ratios, such as 0 dB or −3 dB, of a power of data corresponding to the transmission point or the codeword or the QCL indication information to a power of a reference signal sent by one or more antenna ports corresponding to the data sent by the transmission point. Specifically, a power configuration parameter is determined as follows:

When there are two layers of data in total, a power configuration parameter (a power ratio) may be as follows:

| Transmission point/CW/QCL | Antenna port | Power configuration parameter (power ratio) |
|---|---|---|
| Transmission point 1/CW 1/QCL 1 | 1 layer: port 7 | 0 dB |
| Transmission point 2/CW 2/QCL 2 | 1 layer: port 11 | 0 dB |

When there are three layers of data in total, a power configuration parameter (a power ratio) may be as follows:

| Transmission point/CW/QCL | Antenna port | Power configuration parameter (power ratio) |
|---|---|---|
| Transmission point 1/CW 1/QCL 1 | 1 layer: port 7 | 0 dB |
| Transmission point 2/CW 2/QCL 2 | 2 layers: port 11, port 12; or 2 layers: port 11, port 13 | −3 dB 0 dB | or:

| Transmission point/CW/QCL | Antenna port | Power configuration parameter (power ratio) |
|---|---|---|
| Transmission point 1/CW 1/QCL 1 | 2 layers: port 7, port 8 | 0 dB |
| Transmission point 2/CW 2/QCL 2 | 1 layer: port 11 | 0 dB |

When there are four layers of data in total, a power configuration parameter (a power ratio) may be as follows:

| Transmission point/CW/QCL | Antenna port | Power configuration parameter (power ratio) |
|---|---|---|
| Transmission point 1/CW 1/QCL 1 | 2 layers: port 7, port 8 | 0 dB |
| Transmission point 2/CW 2/QCL 2 | 2 layers: port 11, port 12; or 2 layers: port 11, port 13 | −3 dB 0 dB | or:

| Transmission point/CW/QCL | Antenna port | Power configuration parameter (power ratio) |
|---|---|---|
| Transmission point 1/CW 1/QCL 1 | 1 layer: port 7 | 0 dB |
| Transmission point 2/CW 2/QCL 2 | 3 layers: port 11, port 12, port 13 | −3 dB | or:

| Transmission point/CW/QCL | Antenna port | Power configuration parameter (power ratio) |
|---|---|---|
| Transmission point 1/CW 1/QCL 1 | 3 layers: port 7, port 8, port 9 | −3 dB |
| Transmission point 2/CW 2/QCL 2 | 1 layer: port 11 | 0 dB |

When there are five layers of data in total, a power configuration parameter (a power ratio) may be as follows:

| Transmission point/CW/QCL | Antenna port | Power configuration parameter (power ratio) |
| --- | --- | --- |
| Transmission point 1/CW 1/QCL 1 | 1 layer: port 7 | 0 dB |
| Transmissionpoint 2/CW 2/QCL 2 | 4 layers: port 11, port 12, port 13, port 14 | −3 dB | or:

| Transmission point/CW/QCL | Antenna port | Power configuration parameter (power ratio) |
| --- | --- | --- |
| Transmission point 1/CW 1/QCL 1 | 2 layers: port 7, port 8 | 0 dB |
| Transmission point 2/CW 2/QCL 2 | 3 layers: port 11, port 12, port 13 | −3 dB | or:

| Transmission point/CW/QCL | Antenna port | Power configuration parameter (power ratio) |
| --- | --- | --- |
| Transmission point 1/CW 1/QCL 1 | 3 layers: port 7, port 8, port 9 | −3 dB |
| Transmission point 2/CW 2/QCL 2 | 2 layers: port 11, port 12; or 2 layers: port 11, port 13 | −3 dB 0 dB | or:

| Transmission point/CW/QCL | Antenna port | Power configuration parameter (power ratio) |
| --- | --- | --- |
| Transmission point 1/CW 1/QCL 1 | 4 layers: port 7, port 8, port 9, port 10 | −3 dB |
| Transmission point 2/CW 2/QCL 2 | 1 layer: port 11 | 0 dB |

When there are six layers of data in total, a power configuration parameter (a power ratio) may be as follows:

| Transmission point/CW/QCL | Antenna port | Power configuration parameter (power ratio) |
| --- | --- | --- |
| Transmission point 1/CW 1/QCL 1 | 2 layers: port 7, port 8 | 0 dB |
| Transmission point 2/CW 2/QCL 2 | 4 layers: port 11, port 12, port 13, port 14 | −3 dB | or:

| Transmission point/CW/QCL | Antenna port | Power configuration parameter (power ratio) |
| --- | --- | --- |
| Transmission point 1/CW 1/QCL 1 | 3 layers: port 7, port 8, port 9 | −3 dB |
| Transmission point 2/CW 2/QCL 2 | 3 layers: port 11, port 12, port 13 | −3 dB | or:

| Transmission point/CW/QCL | Antenna port | Power configuration parameter (power ratio) |
| --- | --- | --- |
| Transmission point 1/CW 1/QCL 1 | 4 layers: port 7, port 8, port 9, port 10 | −3 dB |
| Transmission point 2/CW 2/QCL 2 | 2 layers: port 11, port 12; or 2 layers: port 11, port 13 | −3 dB 0 dB |

When there are seven layers of data in total, a power configuration parameter (a power ratio) may be as follows:

| Transmission point/CW/QCL | Antenna port | Power configuration parameter (power ratio) |
| --- | --- | --- |
| Transmission point 1/CW 1/QCL 1 | 3 layers: port 7, port 8, port 9 | −3 dB |
| Transmission point 2/CW 2/QCL 2 | 4 layers: port 11, port 12, port 13, port 14 | −3 dB | or:

| Transmission point/CW/QCL | Antenna port | Power configuration parameter (power ratio) |
| --- | --- | --- |
| Transmission point 1/CW 1/QCL 1 | 4 layers: port 7, port 8, port 9, port 10 | −3 dB |
| Transmission point 2/CW 2/QCL 2 | 3 layers: port 11, port 12, port 13 | −3 dB |

When there are eight layers of data in total, a power configuration parameter (a power ratio) may be as follows:

| Transmission point/CW/QCL | Antenna port | Power configuration parameter (power ratio) |
| --- | --- | --- |
| Transmission point 1/CW 1/QCL 1 | 4 layers: port 7, port 8, port 9, port 10 | −3 dB |
| Transmission point 2/CW 2/QCL 2 | 4 layers: port 11, port 12, port 13, port 14 | −3 dB |

Manner 3: A correspondence between a port number of an antenna port and a transmission point or a codeword or a QCL is dynamic, for example, may be determined based on a mapping between a codeword and a layer or an antenna port in existing LTE. In this manner, because reference signal antenna port patterns corresponding to one or more antenna ports of each transmission point or codeword or QCL may be the same or different, there may be different power ratios, such as 0 dB or −3 dB, of a power of data corresponding to the transmission point or the codeword or the QCL indication information to a power of a reference signal sent by one or more antenna ports corresponding to the data sent by the transmission point. Specifically, a power configuration parameter is determined as follows:

When there are two layers of data in total, a power configuration parameter (a power ratio) may be as follows:

| Transmission point/CW/QCL | Antenna port | Power configuration parameter (power ratio) |
| --- | --- | --- |
| Transmission point 1/CW 1/QCL 1 | 1 layer: port 7 | 0 dB |
| Transmission point 2/CW 2/QCL 2 | 1 layer: port 8 | 0 dB | or:

| Transmission point/CW/QCL | Antenna port | Power configuration parameter (power ratio) |
| --- | --- | --- |
| Transmission point 1/CW 1/QCL 1 | 1 layer: port 11 | 0 dB |
| Transmission point 2/CW 2/QCL 2 | 1 layer: port 13 | 0 dB |

When there are three layers of data in total, a power configuration parameter (a power ratio) may be as follows:

| Transmission point/CW/QCL | Antenna port | Power configuration parameter (power ratio) |
| --- | --- | --- |
| Transmission point 1/CW 1/QCL 1 | 1 layer: port 7 | 0 dB |
| Transmission point 2/CW 2/QCL 2 | 2 layers: port 8, port 9 | −3 dB | or:

| Transmission point/CW/QCL | Antenna port | Power configuration parameter (power ratio) |
| --- | --- | --- |
| Transmission point 1/CW 1/QCL 1 | 1 layer: port 7 | 0 dB |
| Transmission point 2/CW 2/QCL 2 | 2 layers: port 8, port 11 | 0 dB |

When there are four layers of data in total, a power configuration parameter (a power ratio) may be as follows:

| Transmission point/CW/QCL | Antenna port | Power configuration parameter (power ratio) |
| --- | --- | --- |
| Transmission point 1/CW 1/QCL 1 | 2 layers: port 7, port 8 | 0 dB |
| Transmission point 2/CW 2/QCL 2 | 2 layers: port 9, port 10 | 0 dB | or:

| Transmission point/CW/QCL | Antenna port | Power configuration parameter (power ratio) |
| --- | --- | --- |
| Transmission point 1/CW 1/QCL 1 | 2 layers: port 7, port 8 | 0 dB |
| Transmission point 2/CW 2/QCL 2 | 2 layers: port 11, port 13 | 0 dB |

When there are five layers of data in total, a power configuration parameter (a power ratio) may be as follows:

| Transmission point/CW/QCL | Antenna port | Power configuration parameter (power ratio) |
| --- | --- | --- |
| Transmission point 1/CW 1/QCL 1 | 2 layers: port 7, port 8 | 0 dB |
| Transmission point 2/CW 2/QCL 2 | 3 layers: port 9, port 10, port 11 | −3 dB |

When there are six layers of data in total, a power configuration parameter (a power ratio) may be as follows:

| Transmission point/CW/QCL | Antenna port | Power configuration parameter (power ratio) |
| --- | --- | --- |
| Transmission point 1/CW 1/QCL 1 | 3 layers: port 7, port 8, port 9 | −3 dB |
| Transmission point 2/CW 2/QCL 2 | 3 layers: port 10, port 11, port 12 | −3 dB |

When there are seven layers of data in total, a power configuration parameter (a power ratio) may be as follows:

| Transmission point/CW/QCL | Antenna port | Power configuration parameter (power ratio) |
| --- | --- | --- |
| Transmission point 1/CW 1/QCL 1 | 3 layers: port 7, port 8, port 9 | −3 dB |
| Transmission point 2/CW 2/QCL 2 | 4 layers: port 10, port 11, port 12, port 13 | −3 dB |

When there are eight layers of data in total, a power configuration parameter (a power ratio) may be as follows:

| Transmission point/CW/QCL | Antenna port | Power configuration parameter (power ratio) |
| --- | --- | --- |
| Transmission point 1/CW 1/QCL 1 | 4 layers: port 7, port 8, Port 9, Port 10 | −3 dB |
| Transmission point 2/CW 2/QCL 2 | 4 layers: port 11, port 12, port 13, port 14 | −3 dB |

Optionally, when two transmission points transmit data of different layers of one codeword, power ratios of powers of data of different layers/ports to a power of a demodulation reference signal may also be determined according to the foregoing solution. Specifically, details are not described herein again.

Optionally, a terminal device may determine, based on QCL configuration information, whether data sent by an antenna port corresponding to the QCL is from one transmission point or a plurality of transmission points, so as to determine a corresponding power configuration parameter (power ratio). For example, when the data is corresponding to one transmission point, a power configuration parameter in the prior art may be used; or when the data is corresponding to a plurality of transmission points, a power configuration parameter corresponding to the solution in the present invention may be used. Specifically, details are not described herein again.

Further, after receiving the signaling, the terminal device can learn of a power ratio of a power of data on a current layer/port to a power of a demodulation reference signal, so as to determine a power of received data based on the power of the demodulation reference signal, and demodulate the received data. A power of data on a symbol on which a demodulation reference signal exists may be the same as or different from a power of data on a symbol on which no demodulation reference signal exists. A protocol may specify that the data powers are the same. In this case, only one piece of power ratio information is required. When the data powers are different, power ratio information may be separately configured for the data on the symbol on which a demodulation reference signal exists and the data on the symbol on which no demodulation reference signal symbol exists. Alternatively, the foregoing power ratio information may be pre-defined. This is not limited herein in this embodiment of the present invention.

Optionally, it is assumed that the first network device is a terminal device, and the second network device is a base station. The base station may carry a power of a reference signal corresponding to an antenna port identifier or a beam identifier in a PDSCH configuration information field, and/or carry power ratio information Pd. For example, during configuration of a power configuration parameter, a beam/antenna port whose reference signal power has a power ratio relationship with data of a current transmission layer/antenna port may be indicated, so as to determine a data power of a specific transmission layer/antenna port based on the reference signal power of the beam/antenna port.

If the beam identifier/antenna port identifier is set by default, it may be considered that a value of a reference signal power is the same for different beams/antenna ports. Both a reference signal power and a power configuration parameter (an antenna port/beam identifier and a power ratio) can be placed in common information. A value in signaling is used only as an example, and may alternatively be another value. This is not limited herein in this embodiment of the present invention. For example:

```
PDSCH-Config information element
-- ASN1START
PDSCH-ConfigCommon::=   SEQUENCE {
  ReferenceSignalPower    INTEGER (-60..50),
  beam ID/port            ENUMERATED {0, 1, 2, 3, ...} (omissible)
  Pd                      ENUMERATED {
                            dB-6, dB-4, dB-3, dB-1,
                            dB0, dB1, dB2, dB3}
}
```

An information field PDSCH-ConfigCommon is a common information field of a PDSCH configuration, an information field ReferenceSignalPower is a reference signal power information field, an information field beam ID/port is a beam identifier or an antenna port corresponding to a beam, and an information field Pd is a power ratio information field.

Alternatively, a reference signal power information field may include a reference signal power information list ReferenceSignalPower-List, where the reference signal power information list may include one or more pieces of reference signal power information. An information field beam ID/port may include a beam ID/port list beam ID/port-List, where the beam ID/port list may include one or more pieces of information about a beam identifier or an antenna port corresponding to a beam. A power ratio information field may alternatively include a power ratio list Pd-List, where the power ratio list includes one or more power ratios. The beam ID/port-List may be omitted. For example, the power ratio list is arranged in a pre-defined sequence of beam IDs, such as in descending order or ascending order. Therefore, the beam ID/port-List no longer needs to be notified. A value in signaling is used only as an example, and may alternatively be another value. This is not limited herein in this embodiment of the present invention. For example:

PDSCH-Config Information Element

```
PDSCH-Config information element
-- ASN1 START
PDSCH-ConfigCommon::=   SEQUENCE {
  ReferenceSignalPower-List  SEQUENCE (SIZE (1..8))INTEGER (-60..50),
  beam ID/port-List          SEQUENCE (SIZE (1..8)) OF ENUMERATED
                               {0, 1, 2, 3 ...} (omissible)
  Pd-List        SEQUENCE (SIZE (1..8)) OF ENUMERATED
  {dB-6, dB-4, dB-3, dB-1,
                             dB0, dB1, dB2, dB3}
}
```

An information field PDSCH-ConfigCommon is a common information field of a PDSCH configuration, an information field ReferenceSignalPower-List is a reference signal power information list, an information field beam ID/port-List is a beam identifier list or an antenna port list corresponding to a beam, and an information field Pd-List is a power ratio information field list.

A reference signal power may be placed in common information, and a power configuration parameter may be placed in dedicated information. A value in signaling is used only as an example, and may alternatively be another value. This is not limited herein in this embodiment of the present invention. For example:

```
PDSCH-ConfigCommon::=   SEQUENCE {
    ReferenceSignalPower    INTEGER (-60..50),
}
PDSCH-ConfigDedicated::=  SEQUENCE {
    beam ID/port    ENUMERATED {0, 1, 2, 3, ...} (omissible)
    Pd              ENUMERATED {
                        dB-6, dB-4, dB-3, dB-1,
                        dB0, dB1, dB2, dB3}
}
```

An information field PDSCH-ConfigCommon is a common information field of a PDSCH configuration, an information field PDSCH-ConfigDedicated is a dedicated information field of the PDSCH configuration, and may be of a UE level, an information field ReferenceSignalPower is a reference signal power information field, an information field beam ID/port is a beam identifier or an antenna port corresponding to a beam, and an information field Pd is a power ratio information field.

An information field beam ID/port may include a beam ID/port list, where the beam ID/port list may include one or more pieces of information about a beam identifier or an antenna port corresponding to a beam. A power ratio information field may alternatively include a power ratio list Pd-List, where the power ratio list includes one or more power ratios. The beam ID/port-List may be omitted. For example, the power ratio list is arranged in a pre-defined sequence of beam IDs, such as in descending order or ascending order. Therefore, the beam ID/port-List no longer needs to be notified. A value in signaling is used only as an example, and may alternatively be another value. This is not limited herein in this embodiment of the present invention. For example:

```
PDSCH-ConfigDedicated::=
    beam ID/port-List    SEQUENCE {
                         SEQUENCE (SIZE (1..8)) OF ENUMERATED
                         {0, 1, 2, 3, ...} (omissible)
    Pd-List              SEQUENCE (SIZE (1..8)) OF ENUMERATED {
                         dB-6, dB-4, dB-3, dB-1,
                         dB0, dB1, dB2, dB3}
```

An information field PDSCH-ConfigDedicated is a dedicated information field of a PDSCH configuration, and may be of a UE level, an information field beam ID/port-List is a beam identifier list or an antenna port list corresponding to a beam, and an information field Pd-List is a power ratio information field list.

A base station sends a plurality of power configuration parameters, and each power configuration parameter carries a power configuration identifier, such as a power control configuration identifier (Power-control-configID). Information that carries the power configuration identifier may be common or dedicated. A value in signaling is used only as an example, and may alternatively be another value. This is not limited herein in this embodiment of the present invention. For example:

```
PDSCH-control-config::=         SEQUENCE {
    Power-control-configID        INTEGER (1..3)
    ReferenceSignalPower          INTEGER (-60..50),
    beam ID/port                  ENUMERATED {0, 1, 2, 3, ...} (omissible)
    Pd                            ENUMERATED {
                                    dB-6, dB-4, dB-3, dB-1,
                                    dB0, dB1, dB2, dB3}
} OPTIONAL, -- Need ON
```

Alternatively, a reference signal power information field may include a reference signal power information list ReferenceSignalPower-List, where the reference signal power information list may include one or more pieces of reference signal power information. An information field beam ID/port may include a beam ID/port list beam ID/port-List, where the beam ID/port list may include one or more pieces of information about a beam identifier or an antenna port corresponding to a beam. A power ratio information field may alternatively include a power ratio list Pd-List, where the power ratio list includes one or more power ratios. The beam ID/port-List may be omitted. For example, the power ratio list is arranged in a pre-defined sequence of beam IDs, such as in descending order or ascending order. Therefore, the beam ID/port-List no longer needs to be notified. A value in signaling is used only as an example, and may alternatively be another value. This is not limited herein in this embodiment of the present invention. For example:

TABLE 1

| Value | Message |
|---|---|
| $n_{PCID} = 0$ | 0 dB |
| $n_{PCID} = 1$ | -3 dB |
| $n_{PCID} = 2$ | -6 dB |
| $n_{PCID} = 3$ | -9 dB |

It can be learned from Table 1 that, a power configuration identifier is configured for each power ratio. The second network device may send information of Table 1 to the first network device, and needs to notify the first network device of only a power configuration identifier subsequently, and the first network device can learn of a corresponding power ratio, so as to determine a power of received data based on a reference signal power provided by the second network device and the power ratio, and demodulate the received data.

```
Power-control-config::=        SEQUENCE{
    Power-control-configID       INTEGER (1..3)
    ReferenceSignalPower-List    SEQUENCE (SIZE (1..8)) OF INTEGER
                                   (-60..50),
    beam ID/port-List            SEQUENCE (SIZE (1..8)) OF
                                   ENUMERATED {0, 1, 2, 3 ...}
(omissible)
    Pd-List                      SEQUENCE (SIZE (1..8)) OF
                                   ENUMERATED {dB-6, dB-4, dB-3,
                                   dB-1, dB0, dB1, dB2, dB3}
```

An information field ReferenceSignalPower-List is a reference signal power information list, an information field beam ID/port-List is a beam identifier list or an antenna port list corresponding to a beam, and an information field Pd-List is a power ratio information field list.

When there are a plurality of configuration parameters, a base station may notify, through a PDCCH, a terminal device of a power configuration parameter corresponding to a quantity of transmission layers or a port. A specific quantity of bits is not limited herein in this embodiment of the present invention, and the following is only an example:

power control configure Indicator—2 bits or 3 bits

Optionally, the second network device may first pre-define a plurality of power ratios, and then indicate each power ratio by using a power configuration identifier. Refer to Table 1 for possible information that is used to indicate a relationship between each power ratio and a power configuration identifier. In Table 1, each value (Value) is corresponding to one message (Message), or the message may be understood as a state. In other words, one value is corresponding to one state, $n_{PCID}$ is used to identify a power configuration identifier, and a message corresponding to each power configuration identifier is a power ratio.

Further, the second network device then configures information about a correspondence between a power configuration identifier and at least one of a quantity of transmission layers, an antenna port, a codeword, and a scrambling identity.

The following describes information about a correspondence between a power configuration identifier, and a quantity of transmission layers and an antenna port as an example, where a port represents an antenna port.

For example, when a quantity of transmission layers of data is 1, refer to Table 2 for possible information that is used to indicate a correspondence between a power configuration identifier, and a quantity of transmission layers and an antenna port. In Table 2, each value is corresponding to one message. In other words, one value is corresponding to one state. This means that a power configuration identifier, and a quantity of transmission layers and an antenna port that are among a quantity of transmission layers, an antenna port, a codeword, and a scrambling identity are jointly encoded. Refer to the prior art for an encoding rule in this embodiment of the present invention. For example, the value may occupy two bits, three bits, or more bits. An example in which the value occupies two bits is used in Table 2. A value 0 is corresponding to 00, a value 1 is corresponding to 01, a value 2 is corresponding to 10, and a value 3 is corresponding to 11. $n_{PCID}$ in the table represents a power configuration identifier, and is used to denote a power configuration parameter.

TABLE 2

| Value | Message |
|---|---|
| 0 | 1 layer, port 7, $n_{PCID} = 0$ |
| 1 | 1 layer, port 7, $n_{PCID} = 1$ |
| 2 | 1 layer, port 7, $n_{PCID} = 2$ |
| 3 | 1 layer, port 7, $n_{PCID} = 3$ |

It can be learned from Table 2 that, when the quantity of transmission layers is 1, there may be correspondingly four states, and the four states are corresponding to different power configuration identifiers. It indicates that the four states are corresponding to four power configuration parameters. In this way, after the terminal device receives the plurality of power configuration parameters (such as the first power configuration parameter, the second power configuration parameter, and the third power configuration parameter) and also knows a power configuration identifier of each power configuration parameter, the terminal device may determine a correspondence between an antenna port group and a power configuration parameter based on information such as an antenna port in an antenna port group and/or the quantity of transmission layers, and a power configuration identifier that is included in each state, so as to determine a power of data that is from each antenna port group.

For another example, when a quantity of transmission layers is 1, refer to Table 3 for another type of possible information that is used to indicate a correspondence between a power configuration identifier, and a quantity of transmission layers and an antenna port. In Table 3, each value is corresponding to one state. An example in which the value occupies three bits is used in Table 3. A value 0 is corresponding to 000, a value 1 is corresponding to 001, a value 2 is corresponding to 010, and so on.

TABLE 3

| Value | Message |
|---|---|
| 0 | 1 layer, port 7, $n_{PCID} = 0$ |
| 1 | 1 layer, port 7, $n_{PCID} = 1$ |
| 2 | 1 layer, port 7, $n_{PCID} = 2$ |
| 3 | 1 layer, port 7, $n_{PCID} = 3$ |
| 4 | 1 layer, port 8, $n_{PCID} = 0$ |
| 5 | 1 layer, port 8, $n_{PCID} = 1$ |
| 6 | 1 layer, port 8, $n_{PCID} = 2$ |
| 7 | 1 layer, port 8, $n_{PCID} = 3$ |

It can be learned from Table 3 that, when the quantity of transmission layers is 1, there may be correspondingly eight states, and each of the eight states is corresponding to a power configuration identifier. A plurality of states may be corresponding to one configuration identifier, that is, a plurality of states are corresponding to a same power configuration parameter.

For still another example, when a quantity of transmission layers is 2, refer to Table 4 for still another type of possible information that is used to indicate a correspondence between a power configuration identifier, and a quantity of transmission layers and an antenna port. In Table 4, each value is corresponding to one state, each state may further include at least two sub-states, and each sub-state may be corresponding to $n_{PCID}$. An example in which the value occupies two bits is used in Table 4.

TABLE 4

| Value | Message |
|---|---|
| 0 | 2 layers, port 7, $n_{PCID} = 0$ |
|   | 2 layers, port 8, $n_{PCID} = 0$ |
| 1 | 2 layers, port 7, $n_{PCID} = 0$ |
|   | 2 layers, port 8, $n_{PCID} = 1$ |
| 2 | 2 layers, port 7, $n_{PCID} = 0$ |
|   | 2 layers, port 8, $n_{PCID} = 2$ |
| 3 | 2 layers, port 7, $n_{PCID} = 0$ |
|   | 2 layers, port 8, $n_{PCID} = 3$ |

It can be learned from Table 4 that, when the quantity of transmission layers is 2, there may be correspondingly eight states, and each state is corresponding to a power configuration identifier.

For still another example, when a quantity of transmission layers is 3, refer to Table 5 for still another type of possible information that is used to indicate a correspondence between a power configuration identifier, and a quantity of transmission layers and an antenna port. In Table 5, each value is corresponding to one state, each state may further include at least two sub-states, and each sub-state may be corresponding to $n_{PCID}$. An example in which the value occupies three bits is used in Table 5.

TABLE 5

| Value | Message |
|---|---|
| 0 | 3 layers, ports 7-8, $n_{PCID} = 0$ |
|   | 3 layers, port 9, $n_{PCID} = 0$ |
| 1 | 3 layers, ports 7-8, $n_{PCID} = 0$ |
|   | 3 layers, port 9, $n_{PCID} = 1$ |
| 2 | 3 layers, ports 7-8, $n_{PCID} = 0$ |
|   | 3 layers, port 9, $n_{PCID} = 2$ |
| 3 | 3 layers, ports 7-8, $n_{PCID} = 1$ |
|   | 3 layers, port 9, $n_{PCID} = 2$ |
| 4 | 3 layers, port 7, $n_{PCID} = 0$ |
|   | 3 layers, ports 8-9, $n_{PCID} = 0$ |
| 5 | 3 layers, port 7, $n_{PCID} = 0$ |
|   | 3 layers, ports 8-9, $n_{PCID} = 1$ |
| 6 | 3 layers, port 7, $n_{PCID} = 0$ |
|   | 3 layers, ports 8-9, $n_{PCID} = 2$ |
| 7 | 3 layers, port 7, $n_{PCID} = 1$ |
|   | 3 layers, ports 8-9, $n_{PCID} = 2$ |

It can be learned from Table 5 that, when the quantity of transmission layers is 3, there may be correspondingly 16 sub-states, and each of the 16 sub-states is corresponding to a power configuration identifier.

For still another example, when a quantity of transmission layers is 4, refer to Table 6 for still another type of possible information that is used to indicate a correspondence between a power configuration identifier, and a quantity of transmission layers and an antenna port. In Table 6, each value is corresponding to one state, each state may further include at least two sub-states, and each sub-state may be corresponding to $n_{PCID}$. An example in which the value occupies three bits is used in Table 6.

TABLE 6

| Value | Message |
|---|---|
| 0 | 4 layers, ports 7-8, $n_{PCID} = 0$ |
|   | 4 layers, ports 9-10, $n_{PCID} = 0$ |
| 1 | 4 layers, ports 7-8, $n_{PCID} = 0$ |
|   | 4 layers, ports 9-10, $n_{PCID} = 1$ |
| 2 | 4 layers, ports 7-8, $n_{PCID} = 0$ |
|   | 4 layers, ports 9-10, $n_{PCID} = 2$ |

TABLE 6-continued

| Value | Message |
|---|---|
| 3 | 4 layers, ports 7-8, $n_{PCID} = 0$ |
|   | 4 layers, ports 9-10, $n_{PCID} = 3$ |
| 4 | 4 layers, ports 7-8, $n_{PCID} = 1$ |
|   | 4 layers, ports 9-10, $n_{PCID} = 2$ |
| 5 | 4 layers, ports 7-9, $n_{PCID} = 0$ |
|   | 4 layers, port 10, $n_{PCID} = 1$ |
| 6 | 4 layers, ports 7-9, $n_{PCID} = 0$ |
|   | 4 layers, port 10, $n_{PCID} = 2$ |
| 7 | 4 layers, port 7, $n_{PCID} = 1$ |
|   | 4 layers, ports 8-10, $n_{PCID} = 2$ |

It can be learned from Table 6 that, when the quantity of transmission layers is 4, there may be correspondingly 16 sub-states, and each of the 16 sub-states is corresponding to a power configuration identifier.

For still another example, when a quantity of transmission layers is 5, refer to Table 7 for still another type of possible information that is used to indicate a correspondence between a power configuration identifier, and a quantity of transmission layers and an antenna port. In Table 7, each value is corresponding to one state, each state may further include at least two sub-states, and each sub-state may be corresponding to $n_{PCID}$. An example in which the value occupies three bits is used in Table 7.

TABLE 7

| Value | Message |
|---|---|
| 0 | 5 layers, ports 7-8, $n_{PCID} = 0$ |
|   | 5 layers, ports 9-11, $n_{PCID} = 0$ |
| 1 | 5 layers, ports 7-8, $n_{PCID} = 0$ |
|   | 5 layers, ports 9-11, $n_{PCID} = 1$ |
| 2 | 5 layers, ports 7-8, $n_{PCID} = 0$ |
|   | 5 layers, ports 9-11, $n_{PCID} = 2$ |
| 3 | 5 layers, ports 7-8, $n_{PCID} = 1$ |
|   | 5 layers, ports 9-11, $n_{PCID} = 2$ |
| 4 | 5 layers, ports 7-9, $n_{PCID} = 0$ |
|   | 5 layers, ports 10-11, $n_{PCID} = 1$ |
| 5 | 5 layers, ports 7-9, $n_{PCID} = 0$ |
|   | 5 layers, ports 10-11, $n_{PCID} = 2$ |
| 6 | 5 layers, ports 7-9, $n_{PCID} = 0$ |
|   | 5 layers, ports 10-11, $n_{PCID} = 3$ |
| 7 | 5 layers, ports 7-9, $n_{PCID} = 1$ |
|   | 5 layers, ports 10-11, $n_{PCID} = 2$ |

It can be learned from Table 7 that, when the quantity of transmission layers is 5, there may be correspondingly 16 sub-states, and each of the 16 sub-states is corresponding to a power configuration identifier.

For still another example, when a quantity of transmission layers is 6, refer to Table 8 for still another type of possible information that is used to indicate a correspondence between a power configuration identifier, and a quantity of transmission layers and an antenna port. In Table 8, each value is corresponding to one state, each state may further include at least two sub-states, and each sub-state may be corresponding to $n_{PCID}$. An example in which the value occupies three bits is used in Table 8.

TABLE 8

| Value | Message |
|---|---|
| 0 | 6 layers, ports 7-9, $n_{PCID} = 0$ |
|   | 6 layers, ports 10-12, $n_{PCID} = 0$ |
| 1 | 6 layers, ports 7-9, $n_{PCID} = 0$ |
|   | 6 layers, ports 10-12, $n_{PCID} = 1$ |
| 2 | 6 layers, ports 7-9, $n_{PCID} = 0$ |
|   | 6 layers, ports 10-12, $n_{PCID} = 2$ |

TABLE 8-continued

| Value | Message |
|---|---|
| 3 | 6 layers, ports 7-9, $n_{PCID} = 1$ |
|   | 6 layers, ports 10-12, $n_{PCID} = 2$ |
| 4 | 6 layers, ports 7-9, $n_{PCID} = 0$ |
|   | 6 layers, ports 10-12, $n_{PCID} = 3$ |
| 5 | 6 layers, ports 7-9, $n_{PCID} = 1$ |
|   | 6 layers, ports 10-12, $n_{PCID} = 3$ |
| 6 | 6 layers, ports 7-9, $n_{PCID} = 2$ |
|   | 6 layers, ports 10-12, $n_{PCID} = 3$ |
| 7 | 6 layers, ports 7-9, $n_{PCID} = 1$ |
|   | 6 layers, ports 10-12, $n_{PCID} = 1$ |

It can be learned from Table 8 that, when the quantity of transmission layers is 6, there may be correspondingly 16 sub-states, and each of the 16 sub-states is corresponding to a power configuration identifier.

For still another example, when a quantity of transmission layers is 7, refer to Table 9 for still another type of possible information that is used to indicate a correspondence between a power configuration identifier, and a quantity of transmission layers and an antenna port. In Table 9, each value is corresponding to one state, each state may further include at least two sub-states, and each sub-state may be corresponding to $n_{PCID}$. An example in which the value occupies three bits is used in Table 9.

TABLE 9

| Value | Message |
|---|---|
| 0 | 7 layers, ports 7-9, $n_{PCID} = 0$ |
|   | 10 layers, ports 7-13, $n_{PCID} = 0$ |
| 1 | 7 layers, ports 7-9, $n_{PCID} = 0$ |
|   | 7 layers, ports 10-13, $n_{PCID} = 1$ |
| 2 | 7 layers, ports 7-9, $n_{PCID} = 0$ |
|   | 7 layers, ports 10-13, $n_{PCID} = 2$ |
| 3 | 7 layers, ports 7-9, $n_{PCID} = 1$ |
|   | 7 layers, ports 10-13, $n_{PCID} = 2$ |
| 4 | 7 layers, ports 7-10, $n_{PCID} = 0$ |
|   | 7 layers, ports 11-13, $n_{PCID} = 1$ |
| 5 | 7 layers, ports 7-10, $n_{PCID} = 0$ |
|   | 7 layers, ports 11-13, $n_{PCID} = 2$ |
| 6 | 7 layers, ports 7-10, $n_{PCID} = 0$ |
|   | 7 layers, ports 11-13, $n_{PCID} = 3$ |
| 7 | 7 layers, ports 7-10, $n_{PCID} = 1$ |
|   | 7 layers, ports 11-13, $n_{PCID} = 2$ |

It can be learned from Table 9 that, when the quantity of transmission layers is 7, there may be correspondingly 16 sub-states, and each of the 16 sub-states is corresponding to a power configuration identifier.

For still another example, when a quantity of transmission layers is 8, refer to Table 10 for still another type of possible information that is used to indicate a correspondence between a power configuration identifier, and a quantity of transmission layers and an antenna port. In Table 10, each value is corresponding to one state, each state may further include at least two sub-states, and each sub-state may be corresponding to $n_{PCID}$. An example in which the value occupies three bits is used in Table 10.

TABLE 10

| Value | Message |
|---|---|
| 0 | 8 layers, ports 7-10, $n_{PCID} = 0$ |
|   | 8 layers, ports 11-14, $n_{PCID} = 0$ |
| 1 | 8 layers, ports 7-10, $n_{PCID} = 0$ |
|   | 8 layers, ports 11-14, $n_{PCID} = 1$ |

TABLE 10-continued

| Value | Message |
| --- | --- |
| 2 | 8 layers, ports 7-10, $n_{PCID} = 0$ |
|   | 8 layers, ports 11-14, $n_{PCID} = 2$ |
| 3 | 8 layers, ports 7-10, $n_{PCID} = 1$ |
|   | 8 layers, ports 11-14, $n_{PCID} = 2$ |
| 4 | 8 layers, ports 7-10, $n_{PCID} = 1$ |
|   | 8 layers, ports 11-14, $n_{PCID} = 1$ |
| 5 | 8 layers, ports 7-10, $n_{PCID} = 2$ |
|   | 8 layers, ports 11-14, $n_{PCID} = 2$ |
| 6 | 8 layers, ports 7-10, $n_{PCID} = 0$ |
|   | 8 layers, ports 11-14, $n_{PCID} = 3$ |
| 7 | 8 layers, ports 7-10, $n_{PCID} = 1$ |
|   | 8 layers, ports 11-14, $n_{PCID} = 3$ |

It can be learned from Table 10 that, when the quantity of transmission layers is 8, there may be correspondingly 16 sub-states, and each of the 16 sub-states is corresponding to a power configuration identifier.

Table 2 to Table 10 may indicate cases of different quantities of transmission layers. Optionally, power configuration identifiers corresponding to quantities of transmission layers and antenna ports may alternatively be indicated jointly. For example, refer to Table 11 for possible information that is used to indicate a correspondence between a power configuration identifier, and a quantity of transmission layers and an antenna port.

TABLE 11

| Value | Message |
| --- | --- |
| 0 | 1 layer, port 7, $n_{PCID} = 0$ |
| 1 | 1 layer, port 8, $n_{PCID} = 1$ |
| 2 | 2 layers, port 7, $n_{PCID} = 0$ |
|   | 2 layers, port 8, $n_{PCID} = 1$ |
| 3 | 2 layers, port 7, $n_{PCID} = 0$ |
|   | 2 layers, port 8, $n_{PCID} = 2$ |
| ... | ... |
| 4 | 3 layers, ports 7-8, $n_{PCID} = 0$ |
|   | 3 layers, port 9, $n_{PCID} = 1$ |
| 5 | 4 layers, ports 7-8, $n_{PCID} = 0$ |
|   | 4 layers, ports 9-10, $n_{PCID} = 1$ |
| 6 | 5 layers, ports 7-11, $n_{PCID} = 2$ |
| 7 | 8 layers, ports 7-14, $n_{PCID} = 3$ |
| ... | ... |

Table 2 to Table 11 are all used to indicate the information about a correspondence between a power configuration identifier, and a quantity of transmission layers and an antenna port.

The following describes information about a correspondence between a codeword and a power configuration identifier as an example.

For example, when two codewords are used to transmit a power configuration parameter, refer to Table 12 for possible information that is used to indicate a correspondence between a codeword and a power configuration identifier. In Table 12, each value is corresponding to one state, each state may further include at least two sub-states, and each sub-state may be corresponding to $n_{PCID}$. An example in which the value occupies two bits is used in Table 12.

TABLE 12

| Value | Message |
| --- | --- |
| 0 | Codeword 0, $n_{PCID} = 0$ |
|   | Codeword 1, $n_{PCID} = 0$ |
| 1 | Codeword 0, $n_{PCID} = 0$ |
|   | Codeword 1, $n_{PCID} = 1$ |
| 2 | Codeword 0, $n_{PCID} = 0$ |
|   | Codeword 1, $n_{PCID} = 2$ |
| 3 | Codeword 0, $n_{PCID} = 0$ |
|   | Codeword 1, $n_{PCID} = 3$ |

It can be learned from Table 12 that, when two codewords are used to transmit a power configuration parameter, there are correspondingly eight states, and each state is corresponding to a power configuration identifier.

For another example, when two codewords are used to transmit a power configuration parameter, refer to Table 13 for another type of possible information that is used to indicate a correspondence between a codeword and a power configuration identifier. In Table 13, each value is corresponding to one state, each state may further include at least two sub-states, and each sub-state may be corresponding to $n_{PCID}$. An example in which the value occupies three bits is used in Table 13.

TABLE 13

| Value | Message |
| --- | --- |
| 0 | Codeword 0, $n_{PCID} = 0$ |
|   | Codeword 1, $n_{PCID} = 0$ |
| 1 | Codeword 0, $n_{PCID} = 0$ |
|   | Codeword 1, $n_{PCID} = 1$ |
| 2 | Codeword 0, $n_{PCID} = 0$ |
|   | Codeword 1, $n_{PCID} = 2$ |
| 3 | Codeword 0, $n_{PCID} = 1$ |
|   | Codeword 1, $n_{PCID} = 2$ |
| 4 | Codeword 0, $n_{PCID} = 0$ |
|   | Codeword 1, $n_{PCID} = 0$ |
| 5 | Codeword 0, $n_{PCID} = 0$ |
|   | Codeword 1, $n_{PCID} = 1$ |
| 6 | Codeword 0, $n_{PCID} = 0$ |
|   | Codeword 1, $n_{PCID} = 2$ |
| 7 | Codeword 0, $n_{PCID} = 1$ |
|   | Codeword 1, $n_{PCID} = 2$ |

It can be learned from Table 13 that, when there are two codewords, there are correspondingly 16 states, and each state is corresponding to a power configuration identifier.

Both Table 12 and Table 13 are used to indicate information about a correspondence between a codeword and a power configuration identifier.

Optionally, it is assumed that the first network device is a terminal device, and the second network device is a base station. The base station may carry a power configuration identifier in an information field, in DCI, of an antenna port, a scrambling identity, and a quantity of transmission layers, to indicate a specific power configuration parameter that is used. For example:

Antenna port(s), scrambling identity, number of layers and power control indicator—3/4/5/ . . . bits as specified in Table 13 where $n_{SCID}$ is the scrambling identity for antenna ports 7 and 8.

The following describes information about a correspondence between a power configuration identifier, and a quantity of transmission layers, an antenna port, a scrambling identity, and a codeword as an example.

For example, refer to Table 14 for possible information that is used to indicate a correspondence between a power configuration identifier, and a quantity of transmission layers, an antenna port, and a scrambling identity. In Table 14, each value is corresponding to one state, each state may further include at least two sub-states, and each sub-state may be corresponding to $n_{PCID}$. When one codeword is used to transmit the information, refer to a correspondence shown on the left of Table 14; or when two codewords are used to transmit the information, refer to a correspondence shown on the right of Table 14. For example, the second network device is a base station, and the first network device is a terminal device. When the terminal device needs to be multiplexed, a scrambling identity $n_{SCID}$ may be used for distinguishing. An example in which the value occupies three bits is used in Table 14.

TABLE 14

| One codeword: codeword 0 enabled, codeword 1 disabled | | Two codewords: codeword 0 enabled, codeword 1 enabled | |
|---|---|---|---|
| Value | Message | Value | Message |
| 0 | 1 layer, port 7, $n_{PCID} = 0$, $n_{PCID} = 0$ | 0 | 2 layers, ports 7-8, $n_{PCID} = 0$, $n_{PCID} = 0$ |
| 1 | 1 layer, port 7, $n_{PCID} = 1$, $n_{PCID} = 1$ | 1 | 2 layers, ports 7-8, $n_{PCID} = 1$, $n_{PCID} = 1$ |
| 2 | 1 layer, port 8, $n_{PCID} = 0$, $n_{PCID} = 0$ | 2 | 3 layers, ports 7-9, $n_{PCID} = 1$ |
| 3 | 1 layer, port 8, $n_{PCID} = 1$, $n_{PCID} = 1$ | 3 | 4 layers, ports 7-10, $n_{PCID} = 1$ |
| 4 | 2 layers, ports 7-8, $n_{PCID} = 1$ | 4 | 5 layers, ports 7-11, $n_{PCID} = 1$ |
| 5 | 3 layers, ports 7-9, $n_{PCID} = 1$ | 5 | 6 layers, ports 7-12, $n_{PCID} = 1$ |
| 6 | 4 layers, ports 7-10, $n_{PCID} = 1$ | 6 | 7 layers, ports 7-13, $n_{PCID} = 1$ |
| 7 | Reserved | 7 | 8 layers, ports 7-14, $n_{PCID} = 1$ |

It can be learned from Table 14 that, when data is transmitted at one transmission layer, the terminal device may be multiplexed, and different scrambling identities are used to distinguish between different corresponding power configuration identifiers. When data is transmitted at two transmission layers, and two codewords are corresponding to two transmission layers, scrambling identities may also be used to distinguish between power configuration identifiers corresponding to different transmission layers/antenna ports.

For another example, refer to Table 15 for another type of possible information that is used to indicate a correspondence between a quantity of transmission layers, an antenna port, a scrambling identity, and a power configuration identifier. In Table 15, each value is corresponding to one state, each state may further include at least two sub-states, and each sub-state may be corresponding to $n_{PCID}$. An example in which the value occupies four bits is used in Table 15.

It can be learned from Table 15 that, when data is transmitted at one transmission layer, the terminal device may be multiplexed, and different scrambling identities are used to distinguish between different corresponding power configuration identifiers. When data is transmitted at two transmission layers, and two codewords are corresponding to two transmission layers, scrambling identities may also be used to distinguish between power configuration identifiers corresponding to different transmission layers/ports.

It should be noted that, Table 1 to Table 15 are merely examples provided to more clearly describe the technical solutions in this embodiment of the present invention, and are not intended to limit the present invention. Other possible information that is used to indicate a correspondence between a power configuration identifier and at least one of a quantity of transmission layers, an antenna port, a code-

TABLE 15

| One codeword: codeword 0 enabled, codeword 1 disabled | | Two codewords: codeword 0 enabled, codeword 1 enabled | |
|---|---|---|---|
| Value | Message | Value | Message |
| 0 | 1 layer, port 7, $n_{PCID} = 0$, $n_{PCID} = 0$ | 0 | 2 layers, port 7, $n_{PCID} = 0$, $n_{PCID} = 0$ <br> 2 layers, port 8, $n_{PCID} = 0$, $n_{PCID} = 0$ |
| 1 | 1 layer, port 7, $n_{PCID} = 1$, $n_{PCID} = 1$ | 1 | 2 layers, port 7, $n_{PCID} = 1$, $n_{PCID} = 0$ <br> 2 layers, port 8, $n_{PCID} = 1$, $n_{PCID} = 1$ |
| 2 | 1 layer, port 8, $n_{PCID} = 0$, $n_{PCID} = 0$ | 2 | 2 layers, port 7, $n_{PCID} = 1$, $n_{PCID} = 0$ <br> 2 layers, port 8, $n_{PCID} = 1$, $n_{PCID} = 2$ |
| 3 | 1 layer, port 8, $n_{PCID} = 1$, $n_{PCID} = 1$ | 3 | 2 layers, port 7, $n_{PCID} = 1$, $n_{PCID} = 1$ <br> 2 layers, port 8, $n_{PCID} = 1$, $n_{PCID} = 2$ |
| 4 | 2 layers, port 7, $n_{PCID} = 0$ <br> 2 layers, port 8, $n_{PCID} = 0$ | 4 | 3 layers, ports 7-8, $n_{PCID} = 0$ <br> 3 layers, port 9, $n_{PCID} = 0$ |
| 5 | 2 layers, port 7, $n_{PCID} = 0$ <br> 2 layers, port 8, $n_{PCID} = 1$ | 5 | 3 layers, port 7, $n_{PCID} = 0$ <br> 3 layers, ports 8-9, $n_{PCID} = 1$ |
| 6 | 2 layers, port 9, $n_{PCID} = 0$ <br> 2 layers, port 10, $n_{PCID} = 0$ | 6 | 4 layers, ports 7-10, $n_{PCID} = 1$ <br> 4 layers, ports 9-10, $n_{PCID} = 0$ |
| 7 | 2 layers, port 9, $n_{PCID} = 0$ <br> 2 layers, port 10, $n_{PCID} = 1$ | 7 | 4 layers, ports 7-8, $n_{PCID} = 0$ <br> 4 layers, ports 9-10, $n_{PCID} = 1$ |
| 8 | 3 layers, ports 7-8, $n_{PCID} = 0$ <br> 3 layers, port 9, $n_{PCID} = 0$ | 8 | 5 layers, ports 7-9, $n_{PCID} = 0$ <br> 5 layers, ports 10-11, $n_{PCID} = 0$ |
| 9 | 3 layers, ports 7-8, $n_{PCID} = 0$ <br> 3 layers, port 9, $n_{PCID} = 1$ | 9 | 5 layers, ports 7-9, $n_{PCID} = 0$ <br> 5 layers, ports 10-11, $n_{PCID} = 1$ |
| 10 | 3 layers, port 7, $n_{PCID} = 0$ <br> 3 layers, ports 8-9, $n_{PCID} = 1$ | 10 | 6 layers, ports 7-9, $n_{PCID} = 0$ <br> 6 layers, ports 10-12, $n_{PCID} = 0$ |
| 11 | 3 layers, port 7, $n_{PCID} = 0$ <br> 3 layers, ports 8-9, $n_{PCID} = 2$ | 11 | 6 layers, ports 7-9, $n_{PCID} = 0$ <br> 6 layers, ports 10-12, $n_{PCID} = 1$ |
| 12 | 4 layers, ports 7-8, $n_{PCID} = 0$ <br> 4 layers, ports 9-10, $n_{PCID} = 0$ | 12 | 7 layers, ports 7-10, $n_{PCID} = 0$ <br> 7 layers, ports 11-13, $n_{PCID} = 0$ |
| 13 | 4 layers, ports 7-8, $n_{PCID} = 0$ <br> 4 layers, ports 9-10, $n_{PCID} = 1$ | 13 | 7 layers, ports 7-10, $n_{PCID} = 0$ <br> 7 layers, ports 11-13, $n_{PCID} = 1$ |
| 14 | 4 layers, ports 7-8, $n_{PCID} = 0$ <br> 4 layers, ports 9-10, $n_{PCID} = 2$ | 14 | 8 layers, ports 7-10, $n_{PCID} = 0$ <br> 8 layers, ports 11-14, $n_{PCID} = 0$ |
| 15 | 4 layers, ports 7-8, $n_{PCID} = 1$ <br> 4 layers, ports 9-10, $n_{PCID} = 2$ | 15 | 8 layers, ports 7-10, $n_{PCID} = 0$ <br> 8 layers, ports 11-14, $n_{PCID} = 1$ | word, and a scrambling identity also falls within the protection scope of this embodiment of the present invention. This is not limited in this embodiment of the present invention. Further, specific quantities of bits in Table 1 to Table 15 and values in the tables are only examples, and may alternatively be other values. This is not limited herein.

It can be understood that, a correspondence between a transmission layer/antenna port/codeword/scrambling identity and a power configuration parameter/power configuration identifier is designed, and when the first network device receives a data stream transmitted by a distributed antenna, the first network device may determine respective data powers for different data streams (transmission layers), thereby improving data transmission performance.

Optionally, the second network device may further send, to the first network device, information that is used to indicate a correspondence between a beam identifier and at least one of a quantity of transmission layers, an antenna port, and a codeword; and send information about a correspondence between a beam identifier and a power configuration parameter, so that the first network device receives the two pieces of information.

Optionally, each power configuration parameter may further include a power configuration identifier used to indicate the power configuration parameter. The second network device may further send, to the first network device, information that is used to indicate a correspondence between a beam identifier and at least one of a quantity of transmission layers, an antenna port, and a codeword; and send information about a correspondence between a beam identifier and a power configuration identifier, so that the first network device receives the two pieces of information.

In other words, the second network device binds a quantity of transmission layers, an antenna port, and/or a codeword to a beam identifier, and binds a beam identifier to a power configuration parameter/power configuration identifier. When the first network device receives data corresponding to a specific transmission layer, antenna port, and/or codeword, the first network device may find a corresponding power configuration parameter/power configuration identifier based on a bound beam identifier, so as to determine a power of the received data based on the power configuration parameter. The information that is sent by the second network device and that is used to indicate a correspondence between a beam identifier and at least one of a quantity of transmission layers, an antenna port, and a codeword and the information that is used to indicate a correspondence between a beam identifier and a power configuration parameter/power configuration identifier may be sent in a same time unit, or may be sent in different time units; and may be sent by using same signaling, or may be separately sent by using different signaling, for example, may be configured by using RRC signaling or MAC signaling, or sent by using physical layer signaling. This is not limited in this embodiment of the present invention.

Specifically, the second network device may send quasi co-location (QCL) information to the first network device. The first network device determines, by using the QCL information, which beam identifier (beam ID or port) has a QCL relationship with a current transmission layer/antenna port/codeword, so as to determine a power of data corresponding to a transmission layer/antenna port/codeword based on a power configuration parameter (or a power configuration parameter corresponding to a power configuration identifier) and power information of a reference signal corresponding to a beam identifier, where the power information and the power configuration parameter are configured in RRC signaling; and demodulate the received data. The power information of the reference signal and the power configuration parameter (or the power configuration parameter corresponding to the power configuration identifier) may be configured, or may be pre-defined.

On the contrary, the first network device may also determine the QCL information of a current data port based on the power configuration parameter.

It can be understood that, during configuration of a power configuration parameter, a corresponding power configuration identifier may be configured for the power configuration parameter, to uniquely represent the power configuration parameter. Therefore, the second network device may bind a power configuration identifier to at least one of a quantity of transmission layers, an antenna port, a codeword, and a scrambling identity, and/or to a beam identifier. Then, when the first network device receives data corresponding to at least one of a specific transmission layer, antenna port, codeword, and scrambling identity, the first network device may determine a corresponding power configuration parameter; or determine a beam identifier bound to the corresponding power configuration parameter, so as to determine the power configuration parameter based on the beam identifier.

In other words, for different beams, the second network device may transmit data by using different powers. Therefore, different beam identifiers may be corresponding to different power configuration parameters, thereby improving data transmission performance of different beams. In addition, a beam identifier is corresponding to a power configuration parameter, so that signaling overheads can be reduced during configuration of the second network device, and only related beam information needs to be indicated during specific use.

Further, different beam identifiers may be corresponding to codewords, transmission layers, or antenna ports, that is, different codewords, transmission layers, or antenna ports may be sent by using different beams, so as to improve data transmission performance of the corresponding codewords, transmission layers, or antenna ports.

Power information of a reference signal of a beam identifier is determined in the foregoing manner, that is, respective data powers may be determined for different data streams (transmission layers) based on QCL information. Therefore, a data demodulation result is relatively accurate, and data transmission performance is improved.

Figure 5:
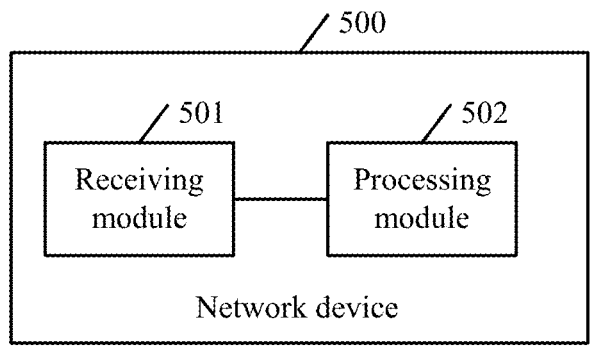
FIG. 5 is a schematic structural diagram of a network device according to an embodiment of the present invention.

Based on a same invention concept, an embodiment of the present invention provides a network device. FIG. 5 is a schematic structural diagram of a network device according to an embodiment of the present invention. As shown in FIG. 5, the network device 500 may include a receiving module 501 and a processing module 502.

The receiving module 501 is configured to receive a first power configuration parameter and a second power configuration parameter that are sent by a second network device, and receive reference signals and data that are sent by the second network device, where the reference signals include a reference signal of a first antenna port group and a reference signal of a second antenna port group.

The processing module 502 is configured to determine a first power of received data (data corresponding to the first antenna port group, namely, data that is from the first antenna port group) based on the first power configuration parameter and the reference signal of the first antenna port group, and determine a second power of received data (data corresponding to the second antenna port group, namely, data that is from the second antenna port group) based on the second power configuration parameter and the reference signal of the second antenna port group.

Optionally, the receiving module 501 is further configured to receive a third power configuration parameter sent by the second network device.

Optionally, any one of the first power configuration parameter, the second power configuration parameter, and the third power configuration parameter includes at least one of a beam identifier, a beam antenna port, a reference signal power, and a power ratio.

The reference signal includes at least one of a demodulation reference signal and a first reference signal. The first reference signal includes at least one of a beam reference signal, a mobility reference signal, and a synchronization signal.

The power ratio includes at least one of the following:

a ratio of a power of data of an antenna port group of a demodulation reference signal on a symbol on which a demodulation reference signal exists to a power of the demodulation reference signal of the antenna port group;

a ratio of a power of data of an antenna port group of a demodulation reference signal on a symbol on which a demodulation reference signal exists to a power of the first reference signal;

a ratio of a power of data of an antenna port group of a demodulation reference signal on a symbol on which no demodulation reference signal exists to a power of the demodulation reference signal of the antenna port group;

a ratio of a power of data of an antenna port group of a demodulation reference signal on a symbol on which no demodulation reference signal exists to a power of data of an antenna port group of a demodulation reference signal on a symbol on which a demodulation reference signal exists; and a ratio of a power of data of an antenna port group of a demodulation reference signal on a symbol on which no demodulation reference signal exists to a power of the first reference signal.

Specifically, a specific manner of receiving, by the receiving module 501, the first power configuration parameter and the second power configuration parameter that are sent by the second network device may be:

obtaining the first power configuration parameter and the second power configuration parameter from the second network device by using RRC signaling, physical layer signaling, or MAC signaling.

Optionally, either of the first antenna port group and the second antenna port group includes at least one antenna port; and either of the first antenna port group and the second antenna port group is corresponding to at least one codeword, or either of the first antenna port group and the second antenna port group is corresponding to at least one transmission layer.

A correspondence between an antenna port group and a codeword and/or a transmission layer may be indicated by the second network device in DCI, or may be pre-defined, or may be notified by using RRC signaling, MAC signaling, or physical layer signaling. This is not limited in this embodiment of the present invention.

It can be understood that, a transmission time interval may be relatively long if the RRC signaling is used, and the RRC signaling may be used to semi-statically configure a power configuration parameter, and is applicable to a scenario with a slow change, to reduce signaling overheads. DCI signaling can implement dynamic configuration, and is applicable to a scenario with a fast change, where signaling overheads need to be further considered. Therefore, a two-level indication may alternatively be used. A plurality of pieces of signaling may be pre-configured, and a further indication is provided during specific use. This is a compromised implementation of the foregoing two manners, and a configuration interval and signaling overheads are moderate. At a first level, RRC signaling, MAC signaling, or physical layer signaling may be used, and at a second level, RRC signaling, MAC signaling, or physical layer signaling may also be used. A same type or different types of signaling or other signaling may be used for the two levels. This is not limited in this embodiment of the present invention.

Further, different power configurations are performed for different codewords, so as to improve codeword decoding performance. A same power configuration may be set in one codeword, so as to reduce signaling overheads. Different power configurations are performed for different transmission layers, so as to improve transmission performance at different layers. Different power configurations are set for an antenna port group, so as to reduce signaling overheads when one antenna port group includes a plurality of antenna ports.

Optionally, the receiving module 501 is further configured to receive information that is sent by the second network device and that is used to indicate a correspondence between a power configuration parameter and at least one of a quantity of transmission layers, an antenna port, a codeword, and a scrambling identity; or receive information that is sent by the second network device and that is used to indicate a correspondence between a beam identifier and at least one of a quantity of transmission layers, an antenna port, and a codeword, and information that is used to indicate a correspondence between a beam identifier and a power configuration parameter; or any one of the first power configuration parameter, the second power configuration parameter, and the third power configuration parameter further includes a power configuration identifier used to indicate the power configuration parameter, and the receiving module 501 is further configured to receive information that is sent by the second network device and that is used to indicate a correspondence between a power configuration identifier and at least one of a quantity of transmission layers, an antenna port, a codeword, and a scrambling identity; or receive information that is sent by the second network device and that is used to indicate a correspondence between a beam identifier and at least one of a quantity of transmission layers, an antenna port, and a codeword, and information that is used to indicate a correspondence between a beam identifier and a power configuration identifier.

The information that is used to indicate a correspondence between a beam identifier and at least one of a quantity of transmission layers, an antenna port, and a codeword and the information that is used to indicate a correspondence between a beam identifier and a power configuration parameter or a power configuration identifier may be sent in a same time unit, or may be sent in different time units; and may be sent by using same signaling, or may be separately sent by using different signaling, for example, may be configured by using RRC signaling or MAC signaling, or sent by using physical layer signaling.

The second network device does not need to carry each power configuration parameter in signaling, but only needs to set a power configuration identifier used to indicate the power configuration parameter, and carry the power configuration identifier in the signaling. Generally, a data amount of a power configuration identifier may be smaller than that of a corresponding power configuration parameter. In this way, a data amount carried by signaling can be reduced.

Further, for different beams, the second network device may transmit data by using different powers. Therefore, different beam identifiers may be corresponding to different power configuration parameters, thereby improving data transmission performance of different beams. A beam identifier is corresponding to a power configuration parameter, so that signaling overheads can be reduced during configuration of the second network device, and only related beam information needs to be indicated during specific use. In addition, different beam identifiers may be corresponding to codewords, transmission layers, or antenna ports, that is, different codewords, transmission layers, or antenna ports may be sent by using different beams, so as to improve data transmission performance of the corresponding codewords, transmission layers, or antenna ports.

Figure 6:
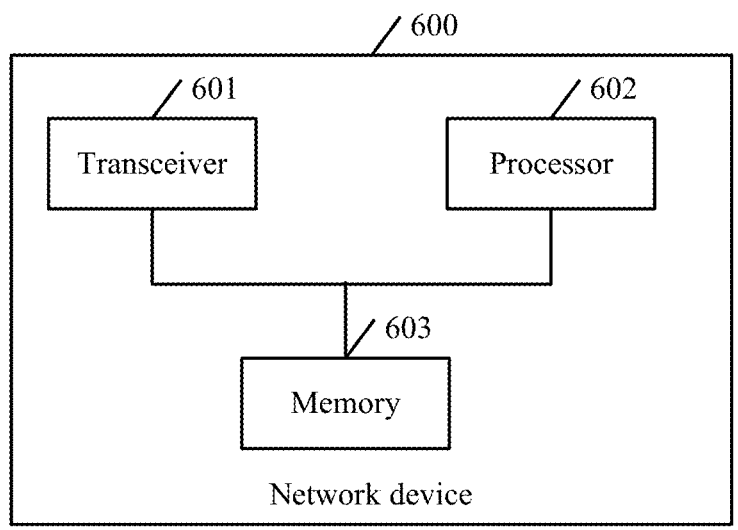
FIG. 6 is a schematic structural diagram of another network device according to an embodiment of the present invention.

Based on a same invention concept, an embodiment of the present invention provides another network device. FIG. 6 is a schematic structural diagram of another network device according to an embodiment of the present invention. As shown in FIG. 6, the network device 600 may include a transceiver 601, a processor 602, and a memory 603.

For example, the processor 602 may include a central processing unit (CPU) or an application-specific integrated circuit (ASIC), may include one or more integrated circuits configured to control program execution, may include a hardware circuit developed by using a field programmable gate array (FPGA), or may include a baseband chip.

There may be one or more memories 603. The memory 603 may include a read-only memory (ROM), a random access memory (RAM), a magnetic disk storage, or the like. The memory 603 may be configured to store an instruction required by the processor 602 to execute a task, and may be further configured to store data.

The transceiver 601 may belong to a radio frequency system, and is configured to perform network communication with an external device. For example, the transceiver 601 may communicate with the external device through a network such as Ethernet, a radio access network, or a wireless local area network.

The transceiver 601, the memory 603, and the processor 602 are connected to each other.

The processor 602 is designed and programmed to permanently write code corresponding to the foregoing methods into a chip, so that during running, the chip can perform the methods described in the foregoing embodiments. How to design and program the processor 602 is a technology well known to a person skilled in the art. Details are not described herein.

The network device 600 may be configured to perform the methods in FIG. 2 to FIG. 4. For example, the network device 600 may be the first network device. Therefore, refer to the descriptions of the foregoing methods for functions and the like implemented by the units in the network device 600. Details are not described again.

It can be understood that, in actual application, an entity device corresponding to the receiving module 501 in the network device 500 shown in FIG. 5 may be the transceiver 601 in FIG. 6, and an entity device corresponding to the processing module 502 may be the processor 602 in FIG. 6.

It can be learned that, the network device shown in FIG. 5 or FIG. 6 may receive a plurality of power configuration parameters sent by a second network device, so as to determine a power of received data based on a power configuration parameter and a power of a reference signal that are corresponding to an antenna port group corresponding to the received data, and demodulate the received data, thereby improving demodulation accuracy, and enhancing data transmission performance.

Figure 7:
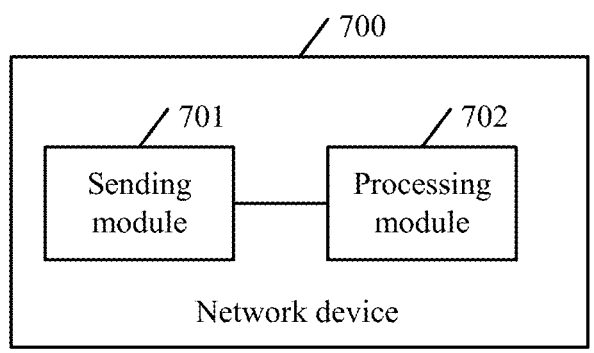
FIG. 7 is a schematic structural diagram of still another network device according to an embodiment of the present invention.

Based on a same invention concept, an embodiment of the present invention provides still another network device. FIG. 7 is a schematic structural diagram of still another network device according to an embodiment of the present invention. As shown in FIG. 7, the network device 700 may include a sending module 701.

The sending module 701 is configured to send a first power configuration parameter and a second power configuration parameter to a first network device, and send reference signals and data to the first network device, where the reference signals include a reference signal of a first antenna port group and a reference signal of a second antenna port group.

The first power configuration parameter and the reference signal of the first antenna port group are used to determine a first power of received data (data corresponding to the first antenna port group, namely, data that is from a first antenna port). The second power configuration parameter and the reference signal of the second antenna port group are used to determine a second power of received data (data corresponding to the second antenna port group, namely, data that is from a second antenna port).

Optionally, the sending module 701 is further configured to send a third power configuration parameter to the first network device.

Optionally, any one of the first power configuration parameter, the second power configuration parameter, and the third power configuration parameter includes at least one of a beam identifier, a beam antenna port, a reference signal power, and a power ratio.

The reference signal includes at least one of a demodulation reference signal and a first reference signal. The first reference signal includes at least one of a beam reference signal, a mobility reference signal, and a synchronization signal.

The power ratio includes at least one of the following:

a ratio of a power of data of an antenna port group of a demodulation reference signal on a symbol on which a demodulation reference signal exists to a power of the demodulation reference signal of the antenna port group;

a ratio of a power of data of an antenna port group of a demodulation reference signal on a symbol on which a demodulation reference signal exists to a power of the first reference signal;

a ratio of a power of data of an antenna port group of a demodulation reference signal on a symbol on which no demodulation reference signal exists to a power of the demodulation reference signal of the antenna port group;

a ratio of a power of data of an antenna port group of a demodulation reference signal on a symbol on which no demodulation reference signal exists to a power of data of an antenna port group of a demodulation reference signal on a symbol on which a demodulation reference signal exists; and a ratio of a power of data of an antenna port group of a demodulation reference signal on a symbol on which no demodulation reference signal exists to a power of the first reference signal.

Specifically, a specific manner of sending, by the sending module 701, the first power configuration parameter and the second power configuration parameter to the first network device may be:

configuring the first power configuration parameter and the second power configuration parameter by using RRC signaling or MAC signaling, or sending the first power configuration parameter and the second power configuration parameter to the first network device by using physical layer signaling.

Optionally, either of the first antenna port group and the second antenna port group includes at least one antenna port; and either of the first antenna port group and the second antenna port group is corresponding to at least one codeword, or either of the first antenna port group and the second antenna port group is corresponding to at least one transmission layer.

A correspondence between an antenna port group and a codeword and/or a transmission layer may be indicated by the second network device in DCI, or may be pre-defined, or may be notified by using RRC signaling, MAC signaling, or physical layer signaling. This is not limited in this embodiment of the present invention.

It can be understood that, a transmission time interval may be relatively long if the RRC signaling is used, and the RRC signaling may be used to semi-statically configure a power configuration parameter, and is applicable to a scenario with a slow change, to reduce signaling overheads. DCI signaling can implement dynamic configuration, and is applicable to a scenario with a fast change, where signaling overheads need to be further considered. Therefore, a two-level indication may alternatively be used. A plurality of pieces of signaling may be pre-configured, and a further indication is provided during specific use. This is a compromised implementation of the foregoing two manners, and a configuration interval and signaling overheads are moderate. At a first level, RRC signaling, MAC signaling, or physical layer signaling may be used, and at a second level, RRC signaling, MAC signaling, or physical layer signaling may also be used. A same type or different types of signaling or other signaling may be used for the two levels. This is not limited in this embodiment of the present invention.

Further, different power configurations are performed for different codewords, so as to improve codeword decoding performance. A same power configuration may be set in one codeword, so as to reduce signaling overheads. Different power configurations are performed for different transmission layers, so as to improve transmission performance at different layers. Different power configurations are set for an antenna port group, so as to reduce signaling overheads when one antenna port group includes a plurality of antenna ports.

Optionally, the sending module 701 is further configured to send, to the first network device, information that is used to indicate a correspondence between a power configuration parameter and at least one of a quantity of transmission layers, an antenna port, a codeword, and a scrambling identity; or send information that is used to indicate a correspondence between a beam identifier and at least one of a quantity of transmission layers, an antenna port, and a codeword, and information that is used to indicate a correspondence between a beam identifier and a power configuration parameter; or any one of the first power configuration parameter, the second power configuration parameter, and the third power configuration parameter further includes a power configuration identifier used to indicate the power configuration parameter, and the sending module 701 is further configured to send, to the first network device, information that is used to indicate a correspondence between a power configuration identifier and at least one of a quantity of transmission layers, an antenna port, a codeword, and a scrambling identity; or send information that is used to indicate a correspondence between a beam identifier and at least one of a quantity of transmission layers, an antenna port, and a codeword, and information that is used to indicate a correspondence between a beam identifier and a power configuration identifier.

The information that is used to indicate a correspondence between a beam identifier and at least one of a quantity of transmission layers, an antenna port, and a codeword and the information that is used to indicate a correspondence between a beam identifier and a power configuration parameter or a power configuration identifier may be sent in a same time unit, or may be sent in different time units; and may be sent by using same signaling, or may be separately sent by using different signaling, for example, may be configured by using RRC signaling or MAC signaling, or sent by using physical layer signaling.

The second network device does not need to carry each power configuration parameter in signaling, but only needs to set a power configuration identifier used to indicate the power configuration parameter, and carry the power configuration identifier in the signaling. Generally, a data amount of a power configuration identifier may be smaller than that of a corresponding power configuration parameter. In this way, a data amount carried by signaling can be reduced.

Further, for different beams, the second network device may transmit data by using different powers. Therefore, different beam identifiers may be corresponding to different power configuration parameters, thereby improving data transmission performance of different beams. A beam identifier is corresponding to a power configuration parameter, so that signaling overheads can be reduced during configuration of the second network device, and only related beam information needs to be indicated during specific use. In addition, different beam identifiers may be corresponding to codewords, transmission layers, or antenna ports, that is, different codewords, transmission layers, or antenna ports may be sent by using different beams, so as to improve data transmission performance of the corresponding codewords, transmission layers, or antenna ports.

Optionally, the network device 701 may further include a processing module 702, which may be configured to process data or signaling sent by an external device.

Figure 8:
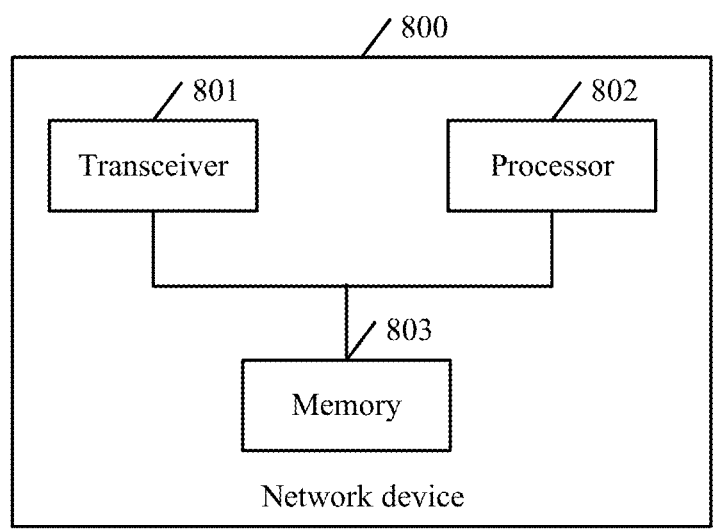
FIG. 8 is a schematic structural diagram of yet another network device according to an embodiment of the present invention.

Based on a same invention concept, an embodiment of the present invention provides yet another network device. FIG. 8 is a schematic structural diagram of yet network device according to an embodiment of the present invention. As shown in FIG. 8, the network device 800 may include a transceiver 801, a processor 802, and a memory 803.

For example, the processor 802 may include a CPU or an ASIC, may include one or more integrated circuits configured to control program execution, may include a hardware circuit developed by using an FPGA, or may include a baseband chip.

There may be one or more memories 803. The memory 803 may include a ROM, a RAM, a magnetic disk storage, or the like. The memory 803 may be configured to store an instruction required by the processor 802 to execute a task, and may be further configured to store data.

The transceiver 801 may belong to a radio frequency system, and is configured to perform network communication with an external device. For example, the transceiver 801 may communicate with the external device through a network such as Ethernet, a radio access network, or a wireless local area network.

The transceiver 801, the memory 803, and the processor 802 are connected to each other.

The processor 802 is designed and programmed to permanently write code corresponding to the foregoing methods into a chip, so that during running, the chip can perform the methods described in the foregoing embodiments. How to design and program the processor 802 is a technology well known to a person skilled in the art. Details are not described herein.

The network device 800 may be configured to perform the methods in FIG. 2 to FIG. 4. For example, the network device 800 may be the second network device. Therefore, refer to the descriptions of the foregoing methods for functions and the like implemented by the units in the network device 800. Details are not described herein.

It can be understood that, in actual application, an entity device corresponding to the sending module 701 in the network device 700 shown in FIG. 7 may be the transceiver 801 in FIG. 8, and an entity device corresponding to the processing module 702 may be the processor 802 in FIG. 8.

It can be learned that, the network device in FIG. 7 or FIG. 8 sends a plurality of power configuration parameters to the first network device, so that the first network device determines a power of received data based on a power configuration parameter and a power of a reference signal that are corresponding to an antenna port group corresponding to the received data, and demodulates the received data, thereby improving demodulation accuracy, and enhancing data transmission performance.

It should be noted that, in the foregoing embodiments, the description of each embodiment has respective focuses. For a part that is not described in detail in an embodiment, refer to related descriptions in other embodiments. In addition, a person skilled in the art should also appreciate that all the embodiments described in this specification are example embodiments, and the related actions and modules are not necessarily mandatory to the present invention.

For example, the module division is merely logical function division and may be other division in actual implementation. For example, a plurality of modules or components may be combined or integrated into another system, or some features may be ignored or not performed. In addition, the shown or discussed mutual couplings or direct couplings or communication connections may be implemented through some interfaces. The indirect couplings or communication connections between the apparatuses or modules may be implemented in electrical or other forms.

The modules described as separate parts may or may not be physically separated, and parts shown as modules may or may not be physical modules, may be located in one position, or may be distributed on a plurality of network modules. Some or all of the modules may be selected according to an actual requirement to implement the embodiments of the present invention.

Function modules in the embodiments of the present invention may be integrated into one processing module, or the modules may be independent physical modules.

When the integrated module is implemented in a form of a software function unit and sold or used as an independent product, the integrated unit may be stored in a computer readable storage medium. Based on such an understanding, all or some of the technical solutions of the present invention may be implemented in a form of a software product. The computer software product is stored in a storage medium and includes several instructions for instructing a computer device, such as a personal computer, a server, a network device, or a processor, to perform all or some of the steps of the methods described in the embodiments of the present invention. The storage medium includes any medium that can store program code, such as a Universal Serial Bus flash drive, a removable hard disk, a ROM, a RAM, a magnetic disk, or an optical disc.

The foregoing embodiments are merely used to describe the technical solutions of the present invention. The foregoing embodiments are merely intended to help understand the methods in the embodiments of the present invention, and shall not be construed as a limitation on the embodiments of the present invention. Any variation or replacement readily figured out by a person skilled in the art shall fall within the protection scope of the embodiments of the present invention.

What is claimed is:

1. A communication method, performed by a terminal, comprising:
   determining a power ratio of a power of data corresponding to an antenna port group to a power of a demodulation reference signal based on a demodulation reference signal pattern and a quantity of layers corresponding to quasi co-location indication information, wherein the quasi co-location indication information is used to indicate a quasi co-location relationship between an antenna port of the demodulation reference signal and an antenna port of a reference signal other than the demodulation reference signal and the determining comprises:
   determining whether the quantity of layers corresponding to the quasi co-location indication information is greater than or equal to a threshold and whether demodulation reference signal patterns corresponding to different layers are different;
   in response to determining that the quantity of layers corresponding to the quasi co-location indication information is greater than or equal to a threshold and demodulation reference signal patterns corresponding to different layers are different, determining that the power ratio is −3 dB; and
   in response to determining that the quantity of layers corresponding to the quasi co-location indication information is less than the threshold, or, the quantity of layers is greater than or equal to the threshold and demodulation reference signal patterns corresponding to different layers are the same, determining that the power ratio is 0 dB; and
   one of sending the data or demodulating the data based on the power ratio.

2. The method according to claim 1, wherein the reference signal other than the demodulation signal comprises at least one of a channel state information reference signal, a cell-specific reference signal, a beam reference signal, or, a mobility reference signal.

3. The method according to claim 1, wherein the threshold is 2.

4. The method according to claim 1, wherein the threshold is configured by a base station.

5. A communication method, performed by a base station, comprising:
   determining a power ratio of a power of data corresponding to an antenna port group to a power of a demodulation reference signal based on a demodulation reference signal pattern and a quantity of layers corresponding to quasi co-location indication information, wherein the quasi co-location indication information is used to indicate a quasi co-location relationship between an antenna port of the demodulation reference signal and an antenna port of a reference signal other than the demodulation reference signal and the determining comprises:

determining whether the quantity of layers corresponding to the quasi co-location indication information is greater than or equal to a threshold and whether demodulation reference signal patterns corresponding to different layers are different;

in response to determining that the quantity of layers corresponding to the quasi co-location indication information is greater than or equal to a threshold and demodulation reference signal patterns corresponding to different layers are different, the power ratio is −3 dB; and in response to determining that the quantity of layers corresponding to the quasi co-location indication information is less than the threshold, or, the quantity of layers is greater than or equal to the threshold and demodulation reference signal patterns corresponding to different layers are the same, determining that the power ratio is 0 dB; and one of sending the data or demodulating the data based on the power ratio.

6. The method according to claim 5, wherein the reference signal other than the demodulation signal comprises at least one of a channel state information reference signal, a cell-specific reference signal, a beam reference signal, or a mobility reference signal.

7. The method according to claim 5, wherein the threshold is 2.

8. The method according to claim 5, wherein the threshold is configured by the base station.

9. An apparatus, comprising a processor, coupled with a non-transitory memory, wherein the memory is configured to store instructions, and the processor is configured to execute the instructions to cause the apparatus perform:

determining a power ratio of a power of data corresponding to an antenna port group to a power of a demodulation reference signal based on a demodulation reference signal pattern and a quantity of layers corresponding to quasi co-location indication information, wherein the quasi co-location indication information is used to indicate a quasi co-location relationship between an antenna port of the demodulation reference signal and an antenna port of a reference signal other than the demodulation reference signal and the determining comprises:

determining whether the quantity of layers corresponding to the quasi co-location indication information is greater than or equal to a threshold and whether demodulation reference signal patterns corresponding to different layers are different;

in response to determining that the quantity of layers corresponding to the quasi co-location indication information is greater than or equal to a threshold and demodulation reference signal patterns corresponding to different layers are different, determining that the power ratio is −3 dB; and in response to determining that the quantity of layers corresponding to the quasi co-location indication information is less than the threshold, or, the quantity of layers is greater than or equal to the threshold and demodulation reference signal patterns corresponding to different layers are the same, determining that the power ratio is 0 dB; and sending the data based on the power ratio.

10. The apparatus according to claim 9, wherein the apparatus is a terminal.

11. The apparatus according to claim 9, wherein the apparatus is a base station.

12. The apparatus according to claim 9, wherein the reference signal other than the demodulation signal comprises at least one of a channel state information reference signal, a cell-specific reference signal, a beam reference signal, or a mobility reference signal.

13. The apparatus according to claim 9, wherein the threshold is 2.

14. The apparatus according to claim 9, wherein the threshold is configured by a base station.

15. An apparatus, comprising a processor, coupled with a memory, wherein the memory is configured to store instructions, and the processor is configured to execute the instructions to cause the apparatus perform:

determining a power ratio of a power of data corresponding to an antenna port group to a power of a demodulation reference signal based on a demodulation reference signal pattern and a quantity of layers corresponding to quasi co-location indication information, wherein the quasi co-location indication information is used to indicate a quasi co-location relationship between an antenna port of the demodulation reference signal and an antenna port of a reference signal other than the demodulation reference signal and the determining comprises;

determining whether the quantity of layers corresponding to the quasi co-location indication information is greater than or equal to a threshold and whether demodulation reference signal patterns corresponding to different layers are different;

in response to determining that the quantity of layers corresponding to the quasi co-location indication information is greater than or equal to a threshold and demodulation reference signal patterns corresponding to different layers are different, determining that the power ratio is −3 dB; and in response to determining that the quantity of layers corresponding to the quasi co-location indication information is less than the threshold, or, the quantity of layers is greater than or equal to the threshold and demodulation reference signal patterns corresponding to different layers are the same, determining that the power ratio is 0 dB; and demodulating the data based on the power ratio.

16. The apparatus according to claim 15, wherein the apparatus is a terminal.

17. The apparatus according to claim 15, wherein the apparatus is a base station.

18. The apparatus according to claim 15, wherein the reference signal other than the demodulation signal comprises at least one of a channel state information reference signal, a cell-specific reference signal, a beam reference signal, or a mobility reference signal.

19. The apparatus according to claim 15, wherein the threshold is 2.

20. The apparatus according to claim 15, wherein the threshold is configured by the apparatus.

* * * * *

UNITED STATES PATENT AND TRADEMARK OFFICE
CERTIFICATE OF CORRECTION

PATENT NO. : 10,863,444 B2  
APPLICATION NO. : 16/505225  
DATED : December 8, 2020  
INVENTOR(S) : Wang et al.

Page 1 of 1

It is certified that error appears in the above-identified patent and that said Letters Patent is hereby corrected as shown below:

In the Claims

Claim 15: Column 66, Line 29:
"mining comprises;"
Should read:
-- mining comprises: --.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*